US011902728B2

(12) United States Patent
Hebbar et al.

(10) Patent No.: US 11,902,728 B2
(45) Date of Patent: Feb. 13, 2024

(54) INTEGRATED LOUDSPEAKER ASSEMBLY

(71) Applicant: Harman International Industries, Incorporated, Stamford, CT (US)

(72) Inventors: Mahesh Hebbar, Northville, MI (US); Patrick Groleau, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/678,705

(22) Filed: Feb. 23, 2022

(65) Prior Publication Data

US 2023/0269505 A1 Aug. 24, 2023

(51) Int. Cl.
*H04R 1/02* (2006.01)
(52) U.S. Cl.
CPC ............. *H04R 1/026* (2013.01); *H04R 1/023* (2013.01); *H04R 1/028* (2013.01); *H04R 2499/13* (2013.01)
(58) Field of Classification Search
CPC ........ H04R 1/026; H04R 1/023; H04R 1/028; H04R 2499/13
See application file for complete search history.

(56) References Cited

U.S. PATENT DOCUMENTS

2016/0345114 A1* 11/2016 Hanna ..................... H04R 3/007
2017/0222612 A1* 8/2017 Zollner .................... H04R 3/12
2019/0200110 A1* 6/2019 Kajihara ................. H04R 9/025
2019/0222922 A1  7/2019 Ito
2021/0164645 A1* 6/2021 Warren ............... F21V 33/0056
2021/0197717 A1  7/2021 Atsumi
2021/0204046 A1* 7/2021 Winton ............... B60R 11/0217
2022/0363202 A1* 11/2022 Groleau ............. B60R 11/0217

FOREIGN PATENT DOCUMENTS

JP      2004074963 A       3/2004
JP      2014220670    *   11/2014   ............... H04R 1/00
WO      2020207693 A1     10/2020

OTHER PUBLICATIONS

European Search Report dated Jul. 3, 2023 for European Application No. 23157753.7, 8 pgs.

* cited by examiner

*Primary Examiner* — Andrew L Sniezek
(74) *Attorney, Agent, or Firm* — Brooks Kushman P.C.

(57) ABSTRACT

A loudspeaker assembly for attachment to an exterior portion of a vehicle. The assembly including a loudspeaker, a base enclosure, and a grille enclosure. The loudspeaker transmits an audio output into an environment that is exterior to the vehicle. The base enclosure receives the loudspeaker and includes a first ramped surface formed on an exterior portion thereof. The grille enclosure includes an integrated loudspeaker grille to cover the loudspeaker. The grille enclosure further includes a second ramped surface positioned on an exterior portion thereof and being positioned directly adjacent to the first ramped surface of the base enclosure when the base enclosure is coupled to the grille enclosure. Each of the first ramped surface and the second ramped surface is non-perpendicular to the integrated loudspeaker grille.

20 Claims, 16 Drawing Sheets

INTEGRATED LOUDSPEAKER ASSEMBLY

TECHNICAL FIELD

Aspects disclosed herein generally relate to an integrated loudspeaker assembly. For example, the integrated loudspeaker assembly may be used in various automotive applications. In particular, the disclosed integrated loudspeaker assembly may be used to generate alerts to pedestrians positioned exterior to a vehicle. These aspects and others will be discussed in more detail below.

BACKGROUND

An Approaching Vehicle Alert System (AVAS) generally includes at least one loudspeaker that is positioned on the vehicle to provide alerts to pedestrians when the vehicle is moving in low speeds in an electric mode. Aspects of the AVAS may be mandated by regulation FMVSS141 for an Electric Vehicle (EV)/Plug-In Hybrid Electric Vehicle (PHEV)/Hybrid vehicle. The loudspeaker(s) is typically packaged outside of a cabin space of the vehicle in a front and/or rear locations of the vehicle. The loudspeakers may be subjected to harsh environment conditions such as extreme temperatures, humidity, water splash, dust, salt, snow, sand exposure, etc.

In general, current loudspeakers and/or electronic controllers that are electrically coupled to the loudspeakers are packaged in enclosures to protect such loudspeakers and electronic controllers from the environment conditions. Current loudspeaker designs may require numerous assembly operations and numerous components to develop and tool. In addition, current loudspeaker designs may have more water sealing joints and thus provide more leak paths and hence less robust. Current loudspeaker designs may be more expensive since there are more components and overall complexity of the assembly process is increased.

SUMMARY

In at least one embodiment, a loudspeaker assembly for attachment to an exterior portion of a vehicle is provided. The assembly includes a loudspeaker, a base enclosure, and a grille enclosure. The loudspeaker transmits an audio output into an environment that is exterior to the vehicle. The base enclosure receives the loudspeaker and includes a first ramped surface formed on an exterior portion thereof. The grille enclosure includes an integrated loudspeaker grille to cover the loudspeaker. The grille enclosure further includes a second ramped surface positioned on an exterior portion thereof and being positioned directly adjacent to the first ramped surface of the base enclosure when the base enclosure is coupled to the grille enclosure. Each of the first ramped surface and the second ramped surface is non-perpendicular to the integrated loudspeaker grille.

In at least one embodiment, a loudspeaker assembly for attachment to a vehicle is provided. The assembly includes a loudspeaker, a base enclosure, and a grille enclosure. The loudspeaker transmits an audio output from the vehicle. The base enclosure receives the loudspeaker and includes a first ramped surface formed on an exterior portion thereof. The grille enclosure includes an integrated loudspeaker grille to cover the loudspeaker. The grille enclosure further includes a second ramped surface on an exterior portion thereof and being positioned adjacent to the first ramped surface of the base enclosure when the base enclosure is coupled to the grille enclosure. Each of the first ramped surface and the second ramped surface extend along a non-perpendicular axis relative to the integrated loudspeaker grille.

In at least one embodiment, a loudspeaker assembly for attachment to a vehicle is provided. The assembly includes a loudspeaker, a base enclosure, and a grille enclosure. The loudspeaker transmits an audio output from the vehicle. The base enclosure receives the loudspeaker and includes a first ramped surface formed thereon. The grille enclosure includes an integrated loudspeaker grille to cover the loudspeaker. The grille enclosure further includes a second ramped surface formed thereon and being positioned adjacent to the first ramped surface of the base enclosure when the base enclosure is coupled to the grille enclosure. Each of the first ramped surface and the second ramped surface extend along a non-perpendicular axis relative to the integrated loudspeaker grille.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With an increased focus by Original Equipment Manufacturers (OEMs) for EVs, it is desirable to provide a cost effective and robust design for loudspeakers used in connection with an AVAS. One method to improve reliability and overall quality for the loudspeaker may involve reducing an overall number of components used in constructing the loudspeaker. This approach also reduces the number of components to assemble which inherently reduces overall cost. For example, by combining an outer shell of the enclosure with a speaker grille, such an implementation may reduce components. In particular, the disclosed loudspeaker provides an enclosure including a speaker grille that are integrated with one another.

Aspects disclosed herein generally provide the loudspeaker grille that is integrated with a portion of the enclosure and another portion that is coupled to the loudspeaker basket that provides a single assembly. The disclosed loudspeaker may be scalable to different sizes and may be used with predetermined materials to allow flexibility in vehicle level packaging. OEMs may also require electronic components (e.g., printed circuit board (PCB) assembly) related to AVAS in the same enclosure that houses the loudspeaker. The disclosed loudspeaker may be an AVAS based loudspeaker and that outputs an audio signal in response to an audio input provided by a controller. In addition, the disclosed loudspeaker may utilize adhesives and mechanical snap features to couple two portions of the enclosure together. The disclosed loudspeaker may be made watertight and may eliminate one or more gaskets which also reduces cost. Alternatively, the two halves may be welded via, for example, vibration welding to provide a tight joint that prevents fluid intrusion. A gasket between the two halves with snap features may also be implemented to provide a waterproof assembly.)

Figure 1:
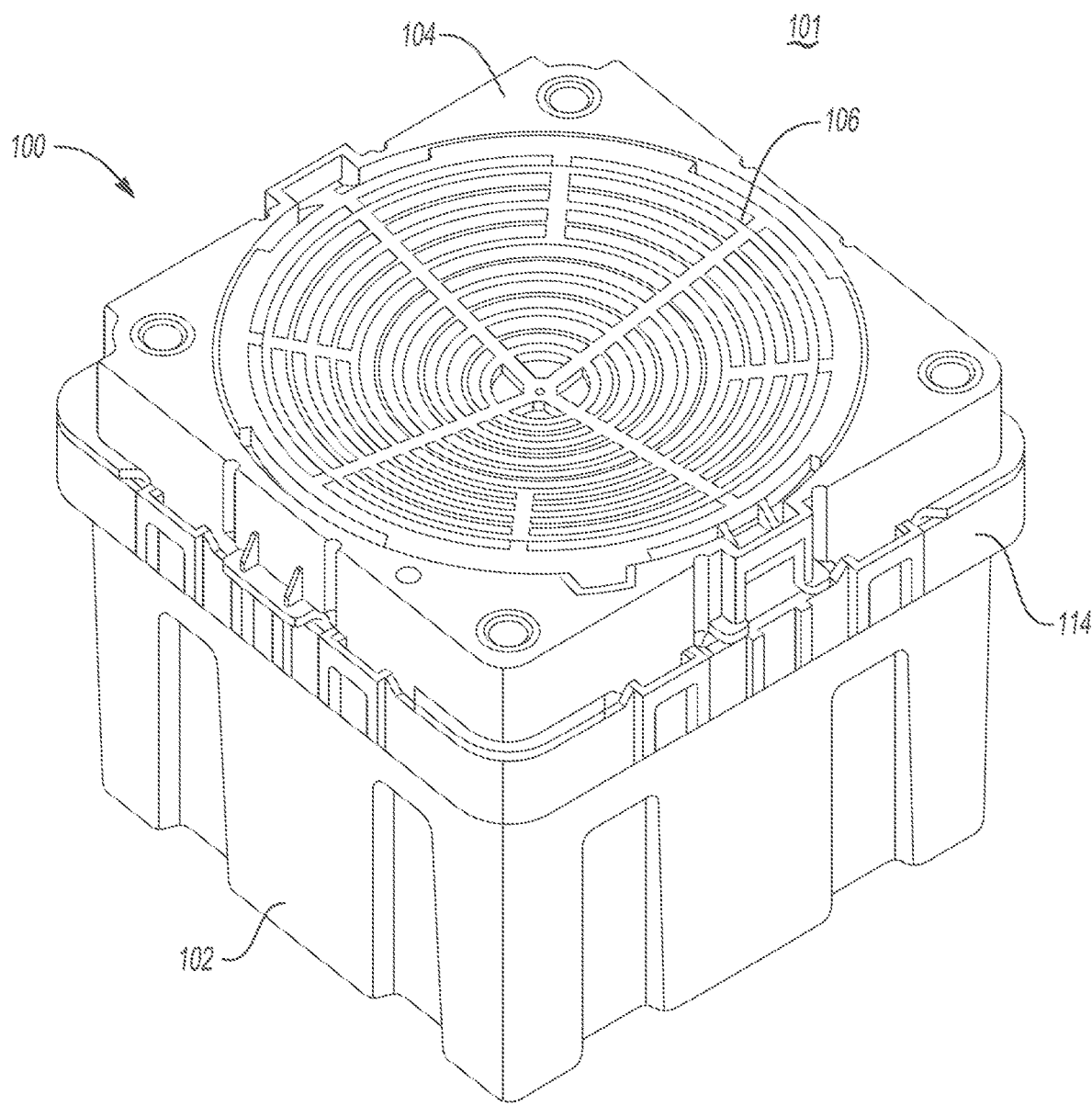
FIG. 1 depicts one example of a loudspeaker assembly for an Approaching Vehicle Alert System (AVAS)
Figure 2:
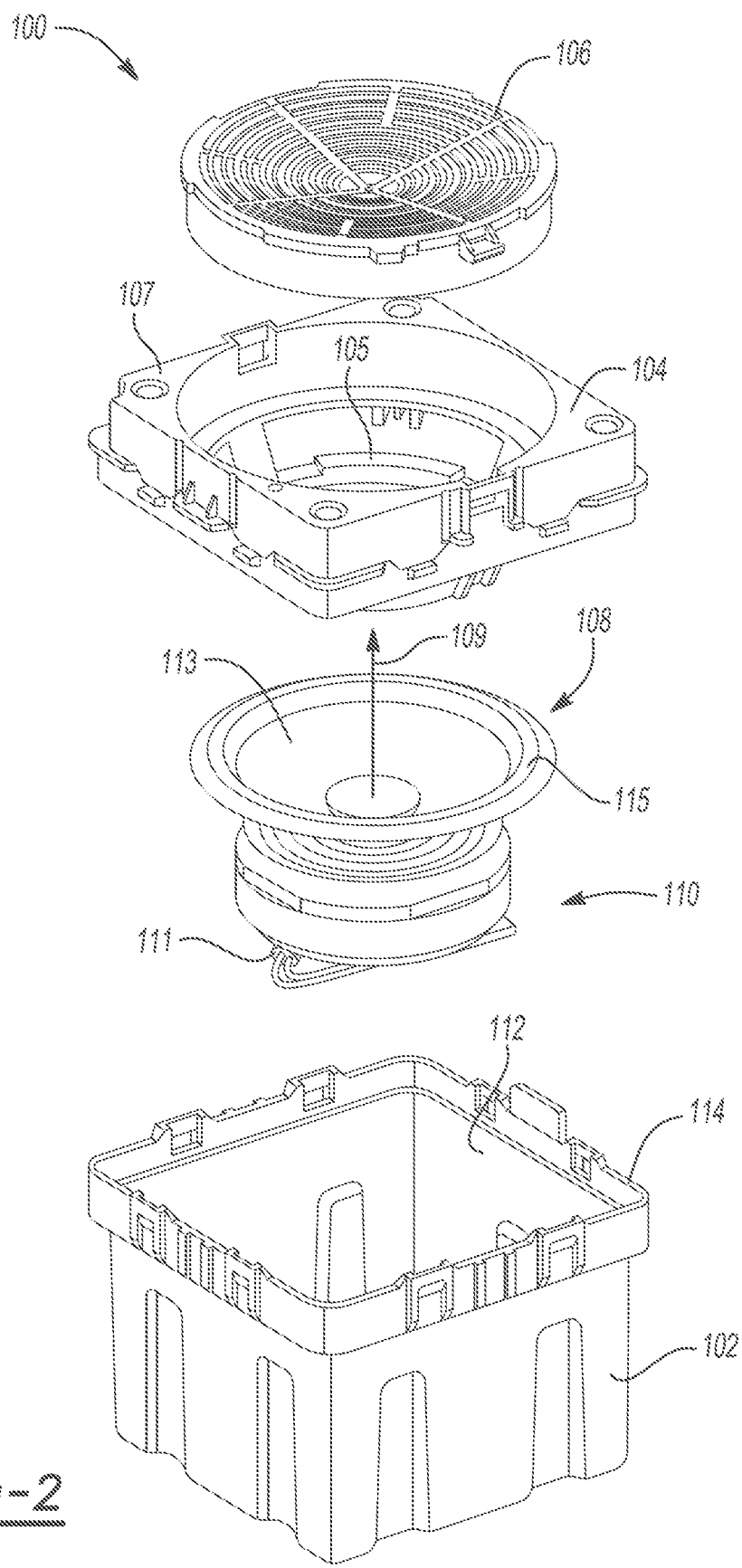
FIG. 2 depicts an exploded view of the loudspeaker assembly of FIG. 1.

FIGS. 1 and 2 depict one example of a loudspeaker assembly ("the assembly") 100 for an Approaching Vehicle Alert System (AVAS). The assembly 100 may be positioned on an exterior portion of a vehicle 101. The assembly 100 include a base enclosure 102, a basket enclosure 104, and a loudspeaker grille 106. The basket enclosure 104 defines an opening for receiving the loudspeaker grille 106. The assembly 100 includes a loudspeaker 108 and a magnetic motor assembly 110. The magnetic motor assembly 110 generally includes a voice coil (not shown) and a magnetic core (not shown). As known, the voice coil and the magnetic core enable a cone (or diaphragm) 113 to generally move along a first axis 109 to transmit an audio output signal. The loudspeaker 108 may transmit the audio output signal anywhere from 160 to 5000 Hz. The basket enclosure 104 includes both a basket 105 that is integrated with an upper portion 107 (or upper half) of the basket enclosure 104. The basket 105 and the upper portion 107 are integrated with one another. As shown, the loudspeaker 108 includes a lead assembly 111 (or lead wires), the cone 113, a surround 115, and a plurality of terminals (not shown). The lead assembly 111 electrically couples the loudspeaker 108 to a power source (not shown) and an audio controller (not shown) via the terminals.

The loudspeaker grille 106 covers the loudspeaker 108 and serves to protect the loudspeaker 108 (e.g., the lead assembly 111, the cone 113, the surround 115, etc.) from direct contact from water or other objects. The base enclosure 102 defines an opening 112 for receiving the loudspeaker 108. The base enclosure 102 also forms a receiving lip 114 positioned on outer perimeter thereof. The receiving lip 114 receives an underside of the basket enclosure 104. The receiving lip 114 and the basket enclosure 104 form a water seal to prevent water or other fluid from intruding into the opening 112 and contacting the components that are associated with the loudspeaker 108. The assembly 100 does not utilize screws to attach the base enclosure 102 to the basket enclosure 104. Rather, the base enclosure 102 and the basket enclosure 104 are coupled to one another via adhesive which also serves to seal the joint formed between the base enclosure 102 and the basket enclosure 104. The base enclosure 102 also provides a vent (not shown) that enables air to flow through while keeping fluids away from the loudspeaker 108.

Figure 3A:
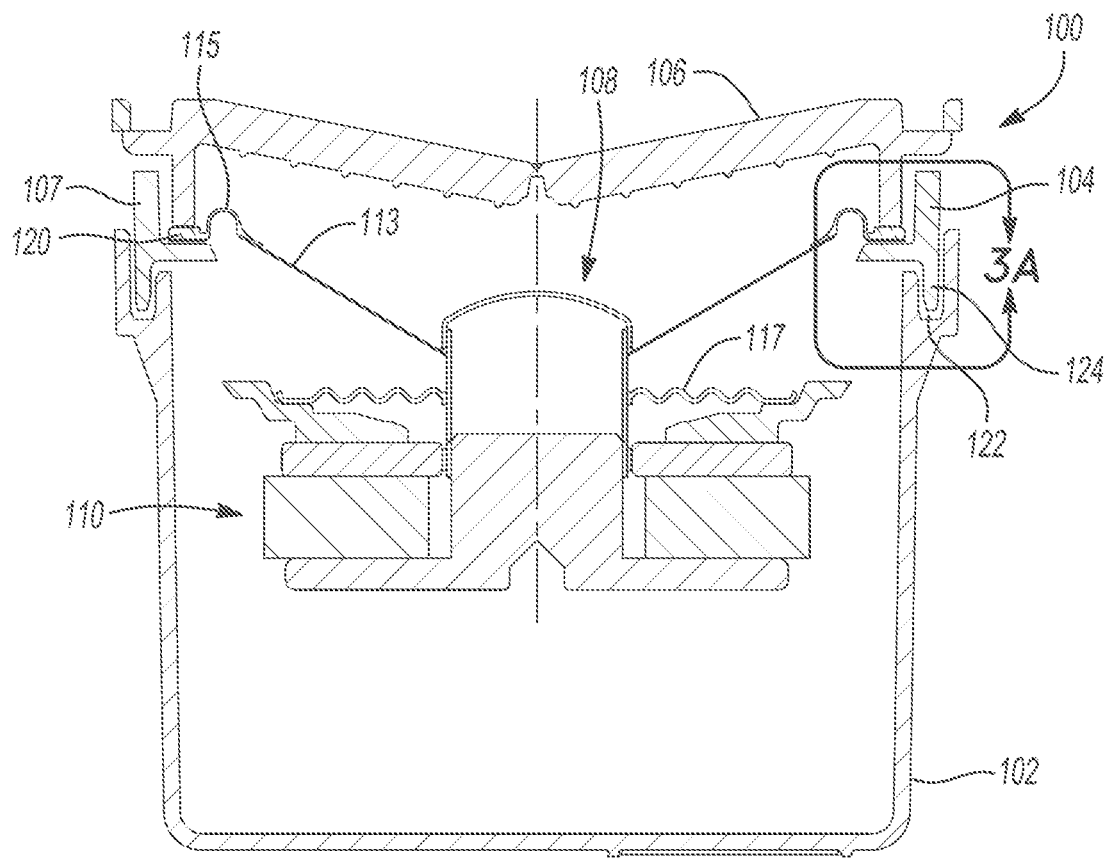
FIG. 3A depicts a cross-sectional view of the loudspeaker assembly of FIG. 1.
Figure 3B:
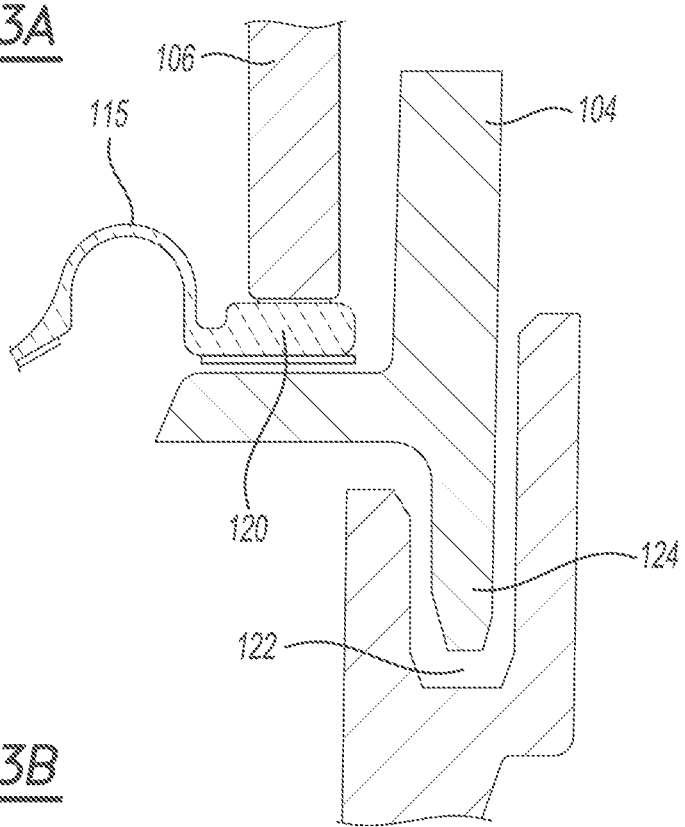
FIG. 3B depicts a more detailed cross-sectional view of one aspect of the loudspeaker assembly of FIG. 3A.

FIG. 3A depicts a cross-sectional view of the loudspeaker assembly 100 of FIG. 1. FIG. 3B depicts a more detailed cross-sectional view of one aspect of the loudspeaker assembly 100 of FIG. 3A. The loudspeaker 108 also includes a spider 117 positioned below the cone 113. The surround 115 includes an outer ring 120 that is integrated therewith. The outer ring 120 receives one end of the loudspeaker grille 106. Adhesive is applied to an underside of the surround 115 to attach the loudspeaker 108 to the basket enclosure 104. Adhesive may also be applied between one end of the loudspeaker grille 106 and a top surface of the outer ring 120 to couple the loudspeaker grille 106 to the outer ring 120. The base enclosure 102 defines an outer channel 122 for receiving a protrusion ring 124 of the basket enclosure 104. The protrusion ring 124 of the basket enclosure 104 is fixed within the outer channel 122 of the base enclosure 102 to couple the base enclosure 102 to the basket enclosure 104. FIG. 3A illustrates the loudspeaker grille 106 is not combined (or integrated) with the basket enclosure 104 and such an implementation requires an additional operation (e.g., attaching the loudspeaker grille 106 to the basket enclosure 104) to the overall assembly process.

Figure 4:
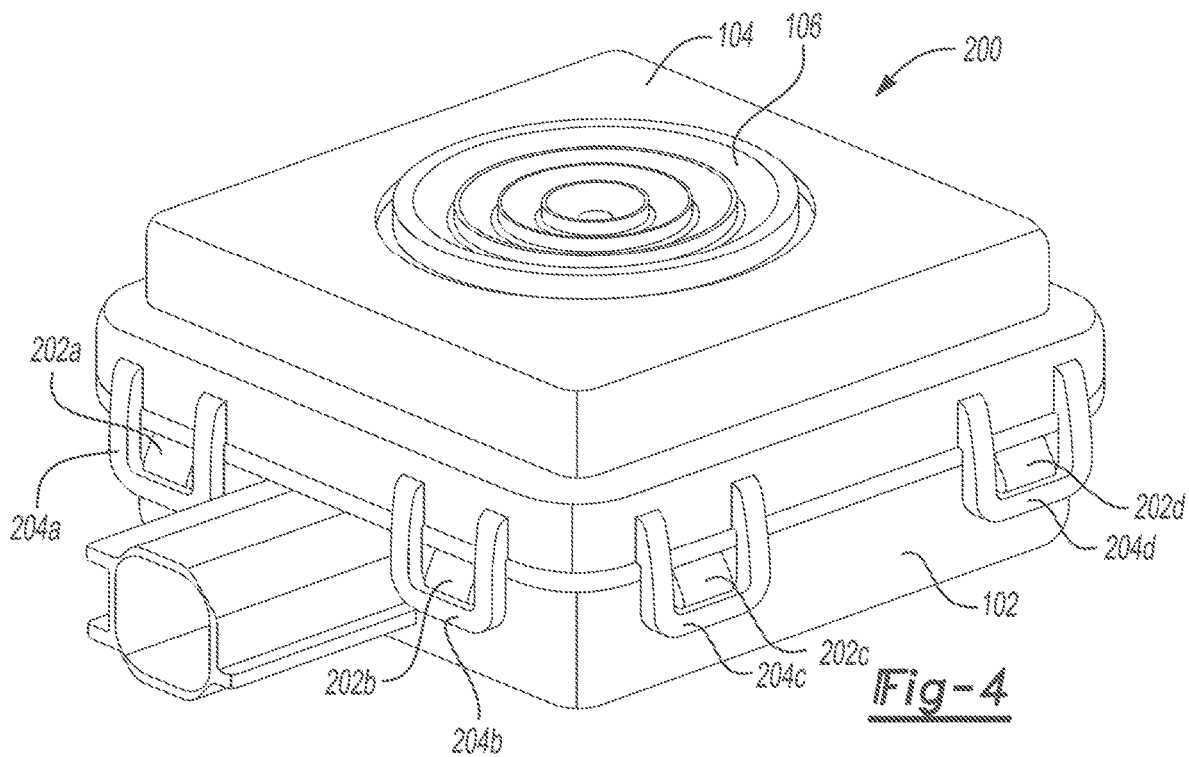
FIG. 4 depicts another example of a loudspeaker assembly for the AVAS.
Figure 5:
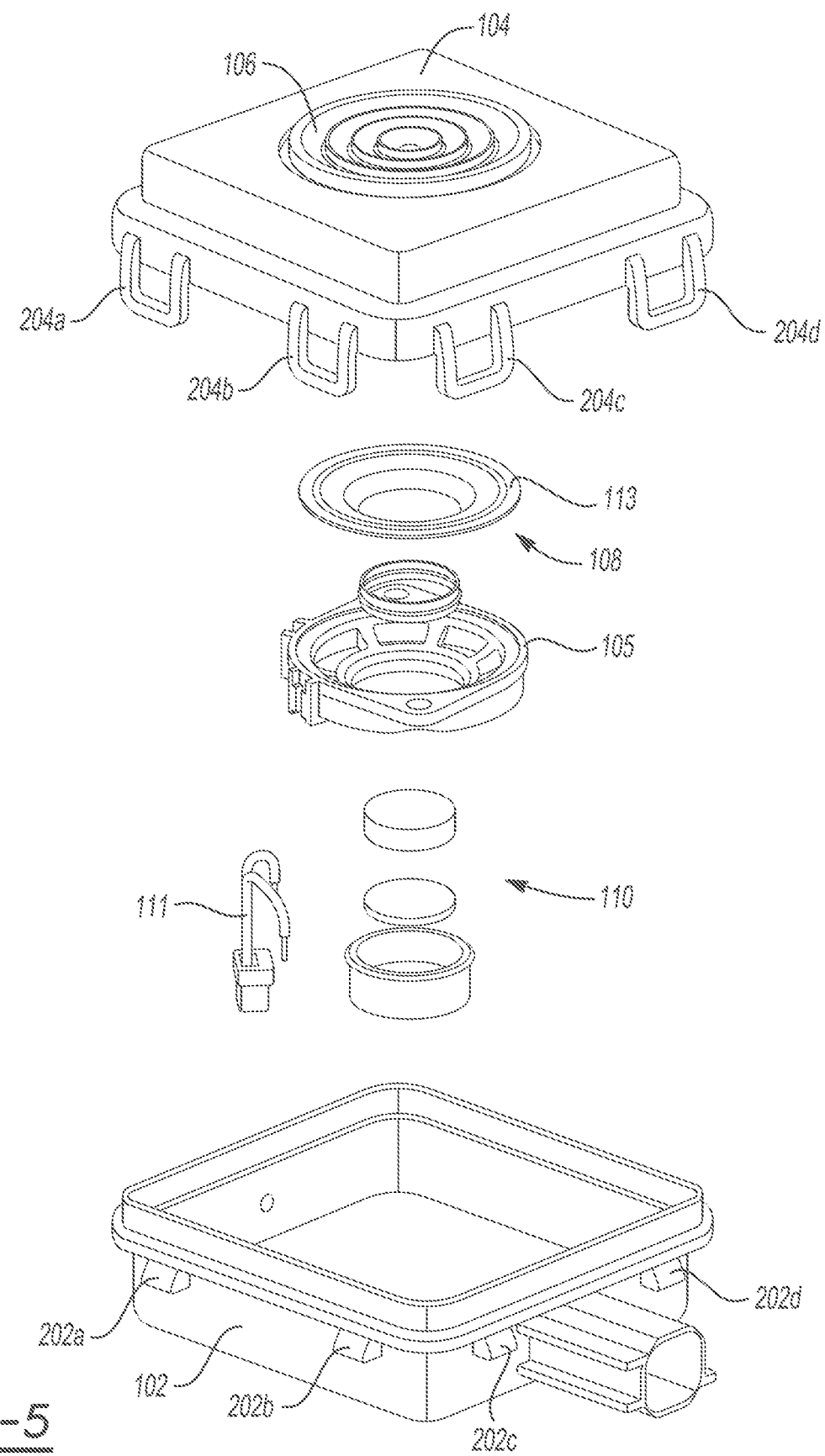
FIG. 5 depicts an exploded view of the loudspeaker assembly of FIG. 4 in accordance with an embodiment.

FIGS. 4 and 5 depict another example of a loudspeaker assembly 200 for the AVAS. As shown, the assembly 200 also includes the base enclosure 102, the basket enclosure 104, the loudspeaker grille 106, and the loudspeaker 108 (see FIG. 5). The assembly 200 generally includes components that are similar to those illustrated in connection with the assembly 100 of FIGS. 1-3. However, for the assembly 200, the loudspeaker grille 106 is integrated with the basket enclosure 104. The basket enclosure 104 includes a plurality of locking ribs 202a-202d. The base enclosure 102 includes a plurality of locking tabs 204a-204d. The locking tabs 204a-204d are positioned over the locking ribs 202a-202d to secure the base enclosure 102 to the basket enclosure 104. For example, the locking tabs 204a-204d slide over the locking ribs 202a-202d and lock to the ribs 202a-202d once the tabs 204a-204d reach an underside of the ribs 202a-202d.

The basket 105 is packaged as a separate component from the basket enclosure 104. In one example, the basket 105 may be coupled to the basket enclosure 104 via adhesive. As noted in connection with the assembly 100, the assembly 200 may also prevent water intrusion into the base enclosure 102 and the basket enclosure 104 to protect the loudspeaker 108. However, to fully prevent water for contacting various components of the loudspeaker 108, sealant may need to be added between the basket enclosure 104 and the basket 105 since such components are not integrated with one another and are coupled via adhesive which may cause leak paths. Because the basket enclosure 104 and the basket 105 are separate components, additional assembly operations may be required which adds expense and complexity.

Figure 6:
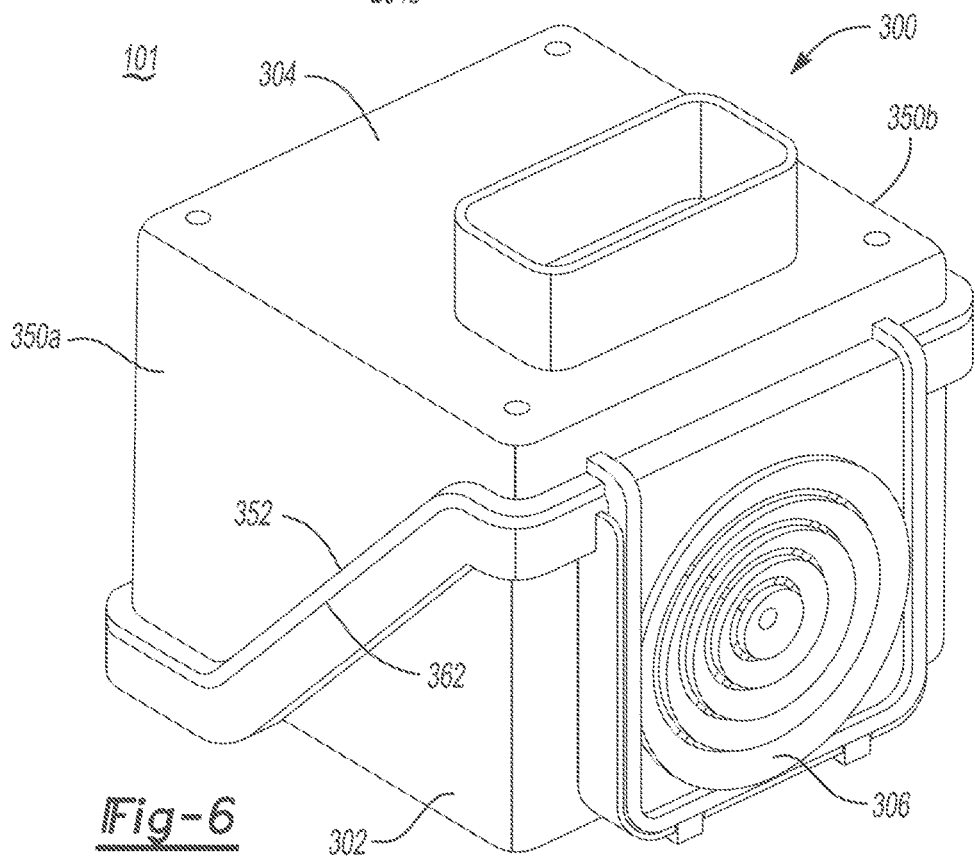
FIG. 6 depicts a loudspeaker assembly for the AVAS in accordance with an embodiment.
Figure 7:
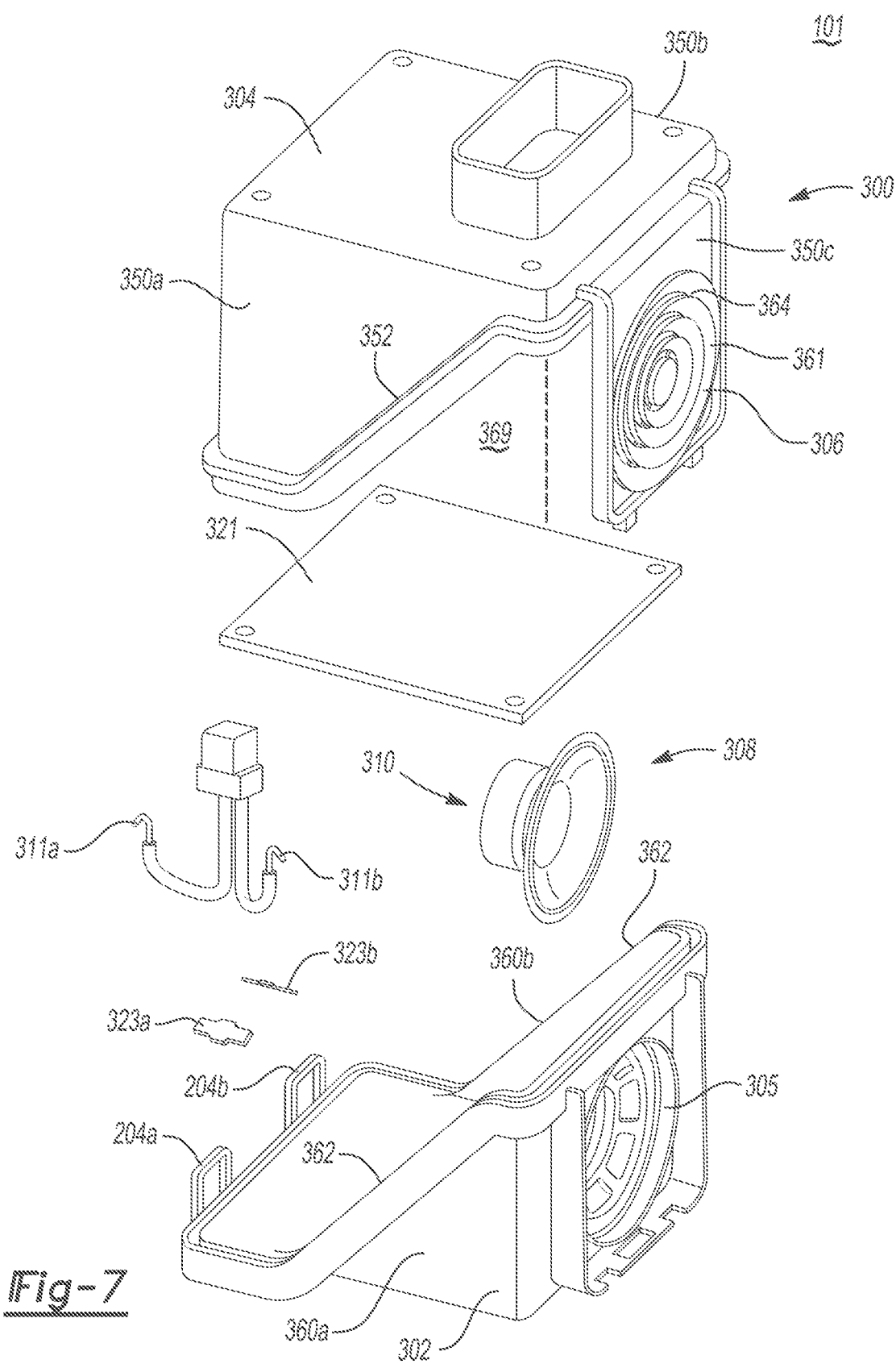
FIG. 7 depicts an exploded view of the loudspeaker assembly of FIG. 6 in accordance with an embodiment.

FIGS. 6 and 7 depict a loudspeaker assembly 300 in accordance with one embodiment. The assembly 300 may be utilized for the AVAS or any other application in which a loudspeaker is required to be positioned in an external environment or may be exposed to harsh environmental conditions. The assembly 300 includes a base enclosure 302 and a grille enclosure 304. The grille enclosure 304 includes a loudspeaker grille 306 that is integrated therewith. As shown, the loudspeaker grille 306 is integrated on a single side of the grille enclosure 304. In addition, the base enclosure 302 includes a loudspeaker basket 305 that is integrated therewith.

The assembly 300 includes a loudspeaker 308, a magnetic motor assembly 310, lead wires 311a-311b, a printed circuit board (PCB) 321, and a plurality of terminals 323a-323b (see FIG. 7). These components will be discussed in more detail below. As generally shown, the grille enclosure 304 includes a first side 350a and a second side 350b each having an angled (or ramped) surface 352. The grille enclosure 304 includes a third side 350c in which the loudspeaker grille 306 is integrated thereon. Similarly, the base enclosure 302 includes a first side 360a and a second side 360b each also having an angled (or ramped) surface 362. When the grille enclosure 304 is mated to the base enclosure 302, the ramped surfaces 352 and 362 abut one another as shown in FIG. 6. As shown the ramped surface 352 on the first and the second sides 350a, 350b is generally inclined relative to the loudspeaker grille 306 that is integrated with the grilled enclosure 304.

By utilizing the ramped surface 352 that is formed on the first and second sides 350a and 350b, it is possible to utilize an injection mold tool to form the third side 350c including the loudspeaker grille 306 as integrated on the grille enclosure 304. For example, the tool can insert a mold dispenser into an opening 369 formed by the ramped surface 352 to then dispense the mold (or material) that forms the third side 350c and the loudspeaker grille 306. The tool generally includes sliders and lifters that move (e.g., open or close) in various orientations or angles (or "action" as known in the art). Thus, the tool may be controlled with the assistance of action (e.g., additional movement both above and beyond the opening of core and cavity of the tool) to form the ramped surface 352 on the first and the second sides 350a, 350b and to also form the integrated grille enclosure 304 on the third side 350c.

The loudspeaker grille 306 is configured to protect the loudspeaker 308 from receiving a direct splash of water or other fluid or debris while the assembly 300 is packaged on the vehicle 101. The loudspeaker grille 306 enables air to pass from out of the assembly 300 and into the exterior environment. The loudspeaker grille 306 includes angled louvers 361 defining a plurality of openings 364 to enable audio generated from the loudspeaker 308 to be transmitted to an external environment.

Adhesive may be applied to an entire seam (or interface) that is formed by the base enclosure 302 and the grille enclosure 304 when such components are mated with one another to seal the interface between the two. The manner in which the base enclosure 302 and the grille enclosure 304 may be coupled with one another will be discussed in more detail below.

Figure 8:
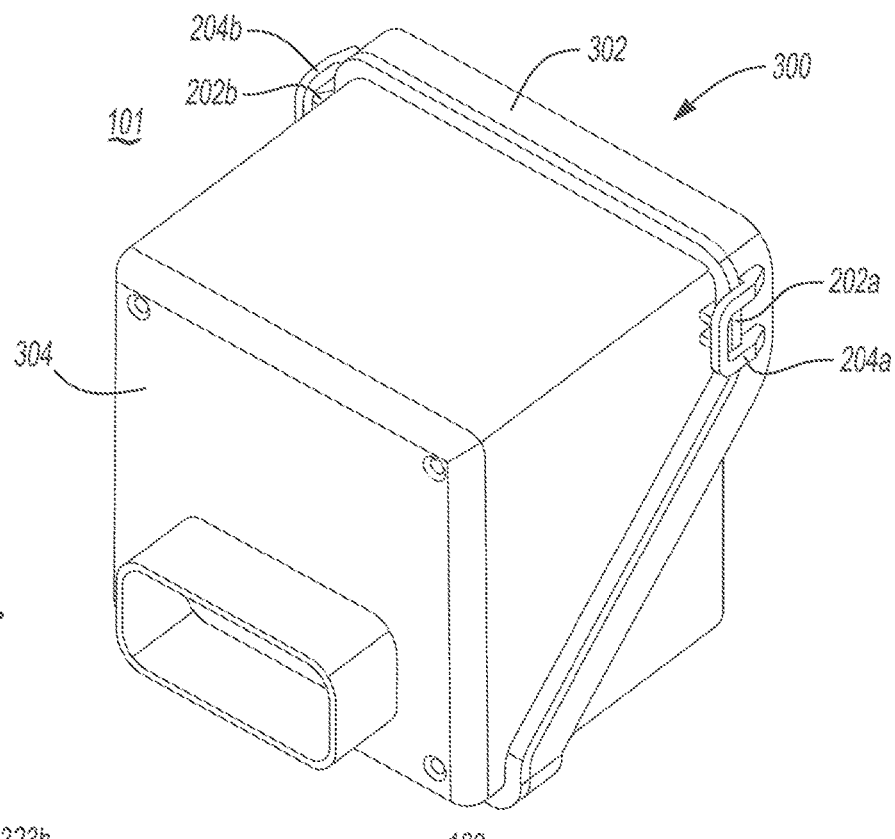
FIG. 8 depicts the manner in which the loudspeaker assembly may be positioned in the vehicle in accordance with one embodiment.

FIG. 8 depicts the manner in which the loudspeaker assembly 300 may be positioned in the vehicle 101 in accordance with one embodiment. In general, the loudspeaker assembly 300 may be coupled to any exterior portion of the vehicle 101. The loudspeaker 308 is generally orientated downward toward a bottom 103 of the vehicle 101 and transmits audio toward the ground positioned below the vehicle 101.

Figure 9:
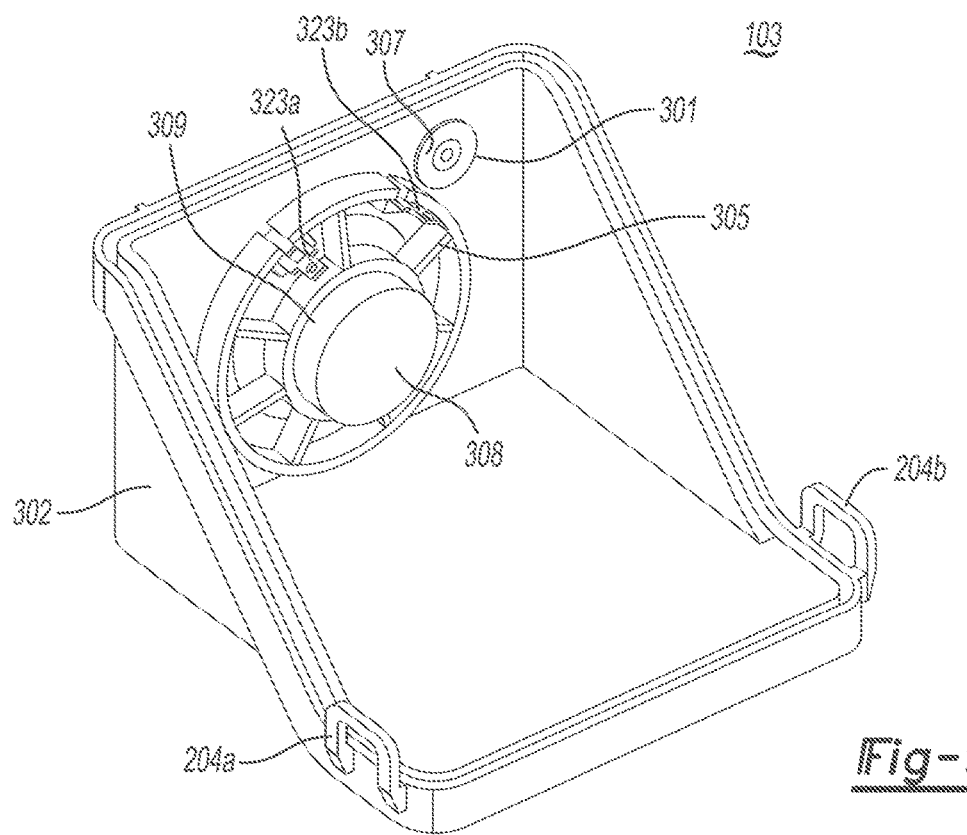
FIG. 9 depicts a rear view of the base enclosure in accordance with one embodiment.

FIG. 9 depicts a rear view of the base enclosure 302 in accordance with one embodiment. As shown, the loudspeaker basket 305 defines an opening 309 for receiving an end of the loudspeaker 308. The loudspeaker basket 305 includes a receiving portion 301 and defines an opening (not shown) therein. A vent disc 307 may be inserted into the receiving portion 301 and covers the opening within the receiving portion 301. The vent disc 307 aids in regulating pressure due to temperature variations on the assembly 300 when sealed. The vent disc 307 may be secured to the opening via adhesive (e.g., pressure sensitive adhesive) or by heat staking. The base enclosure 302 includes the plurality of locking tabs 204a-204b for engaging corresponding ribs 202a-202b (see FIG. 8 for the ribs 202a-202b).

Figure 10A:
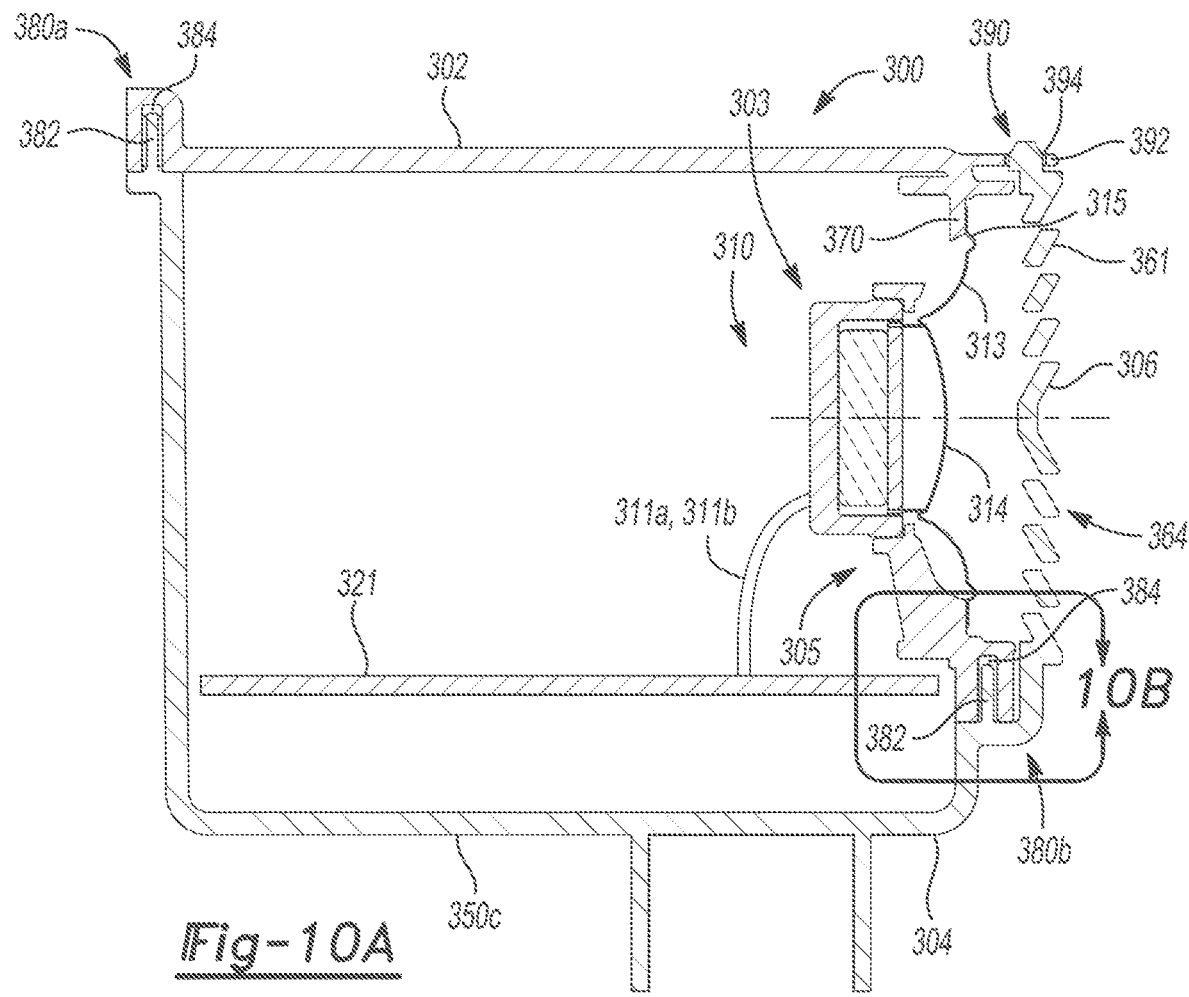
FIG. 10A depicts a cross-sectional view of the loudspeaker assembly of FIG. 8 in accordance with an embodiment.
Figure 10B:
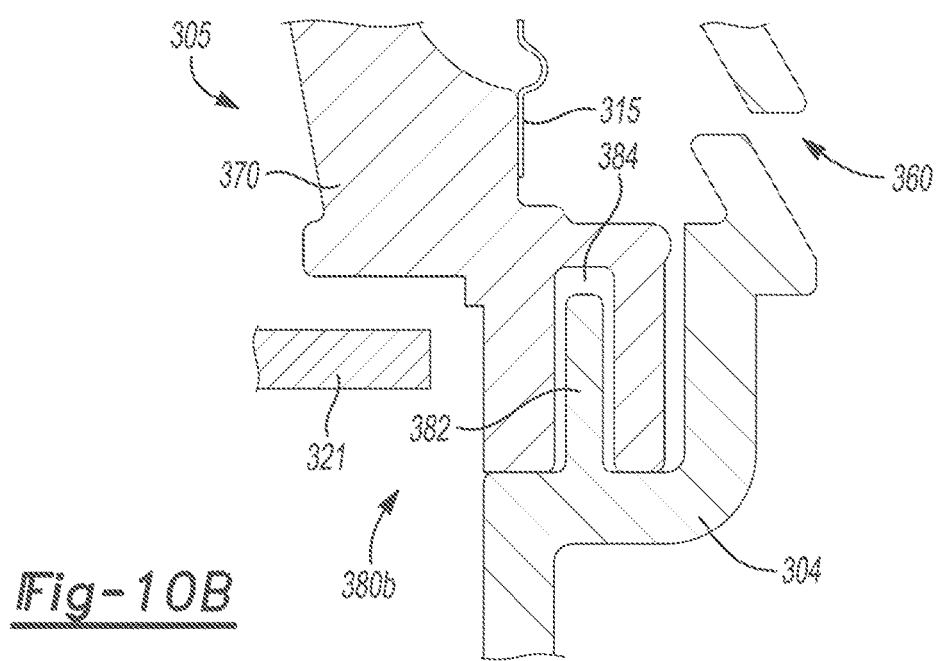
FIG. 10B depicts a more detailed cross-sectional view of one aspect of the loudspeaker assembly of FIG. 10A.

FIG. 10A depicts a cross-sectional view of the loudspeaker assembly 300 of FIGS. 6-7 in accordance with an embodiment. FIG. 10B depicts a more detailed cross-sectional view of the loudspeaker assembly 300 of FIG. 10A. The loudspeaker grille 306 defines a plurality of grooves or openings 364 to enable the audio output to be transmitted therefrom. As noted above, the loudspeaker grille 306 includes the plurality of louvers 361 that are angled and that form the plurality of openings 364. The louvers 361 that form the openings 364 are arranged per acoustic transparency to meet performance requirements. Additional embodiments will be discussed further below.

The loudspeaker 308 includes the magnetic motor assembly 310, a cone 313, a cap 314, and a surround 315. The cone 313 surrounds the cap 314. The surround 315 surrounds the cone 313 and the cap 314. The loudspeaker 308 may be used as a 40 mm loudspeaker. It is recognized that the overall size of the loudspeaker 308 may vary based on the desired criteria of a particular implementation. As shown, the loudspeaker 308 is positioned about the loudspeaker basket 305. For example, the loudspeaker basket 305 includes a baffle 370 for receiving an end section of the surround 315. The PCB 321 is positioned below the loudspeaker 308 and is parallel to the second side 350b of the grille enclosure 304. The PCB 321 may be coupled to a side wall of the grille enclosure 304 via adhesive, heat staking, or screws. The lead wires 311a, 311b may be coupled to the PCB 321 via terminals 323a, 323b and to the loudspeaker 308 to electrically couple the loudspeaker 308 to an audio controller.

The base enclosure 302 and the grille enclosure 304 are coupled to one another via a plurality of engagement mechanisms 380a-380b ("380") instead of the locking tabs and locking ribs as discussed above. The engagement mechanisms 380a-380b generally comprise a tongue and groove arrangement which enables the base enclosure 302 to be coupled to the grille enclosure 304. For example, each of the engagement mechanisms 380a-380b may include a tongue 382 and a groove 384. The tongue 382 protrudes from a section of the grille enclosure 304 and is received by the groove 384 as formed in the base enclosure 302. It is also recognized that the tongue 382 may be positioned on the base enclosure 302 and that the groove 384 may be formed on the grille enclosure 304. Adhesive may be applied in various gaps that are present within or around the tongue 382 and the groove 384 arrangement when the tongue 382 is inserted into the groove 384 to aid in retaining or coupling the base enclosure 302 to the grille enclosure 304. In addition, another engagement mechanism 390 is provided in which a protrusion 392 is provided on the base enclosure 302 for being received by a groove 394 on the grille enclosure 304. Similarly, adhesive may be applied to the interface formed by the protrusion 392 and the groove 394 to also aid in sealing and securing the base enclosure 302 to the grille enclosure 304.

Figure 11:
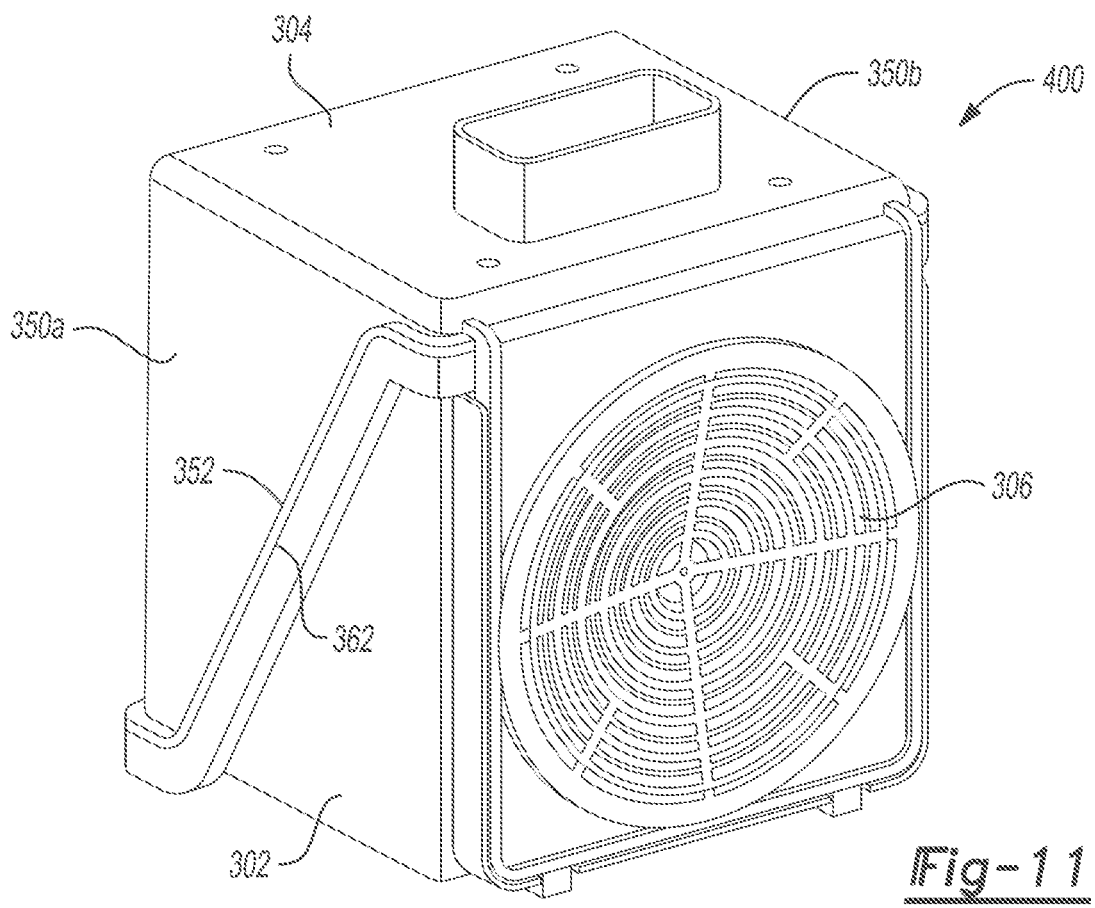
FIG. 11 depicts another of a loudspeaker assembly for the AVAS in accordance with an embodiment.
Figure 12:
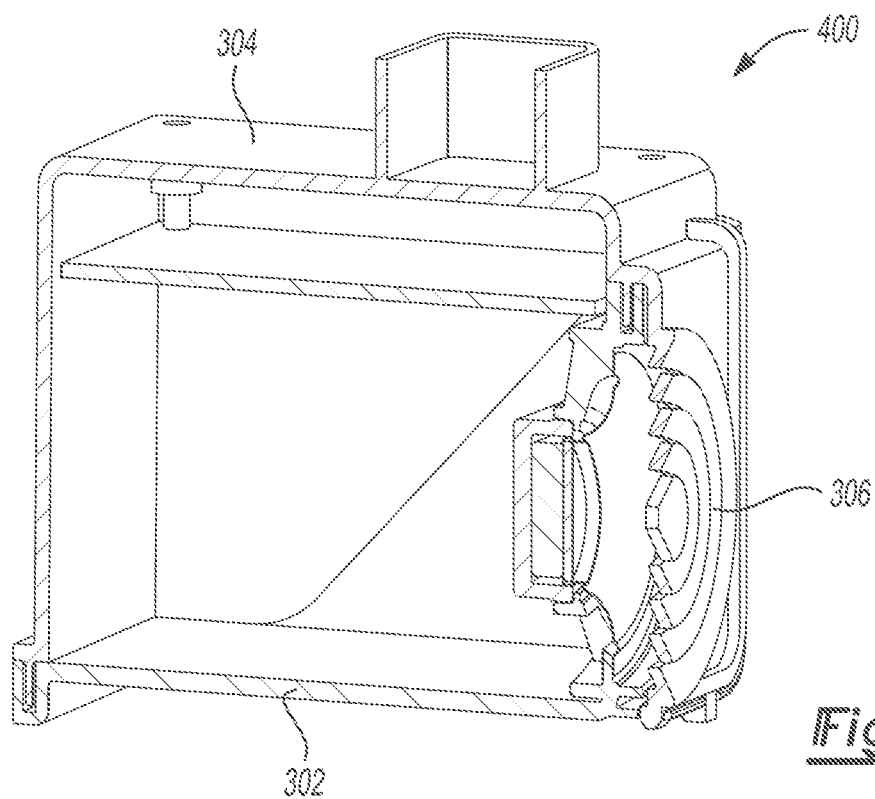
FIG. 12 depicts a cross-sectional view of the loudspeaker assembly of FIG. 9 in accordance with an embodiment.
Figure 13:
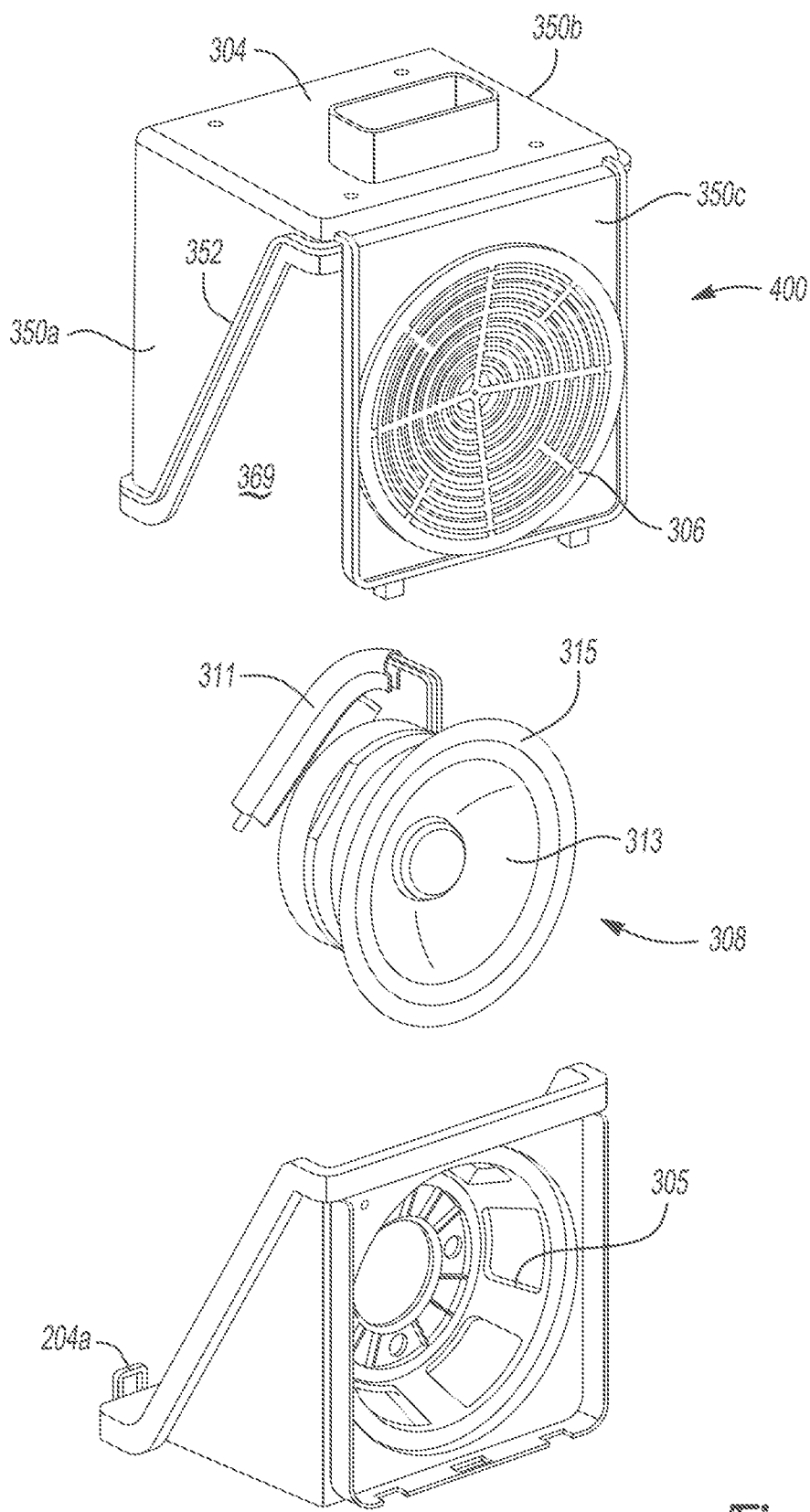
FIG. 13 depicts an exploded view of the loudspeaker assembly of FIG. 11 in accordance with an embodiment.

FIGS. 11-13 depict another loudspeaker assembly 400 for the AVAS in accordance with an embodiment. The assembly 400 is generally similar to the assembly as noted in connection with FIGS. 6-8, however, the size of the loudspeaker 308 is 80 mm and a lead assembly 311 as shown in FIG. 13 may be part of a voice coil of the loudspeaker 308. In general, the aspects noted in connection with the assembly 400 of FIGS. 11-13 are similar to those noted in connection with the assembly 300 of FIGS. 6-8 unless otherwise stated herein.

Figure 14:
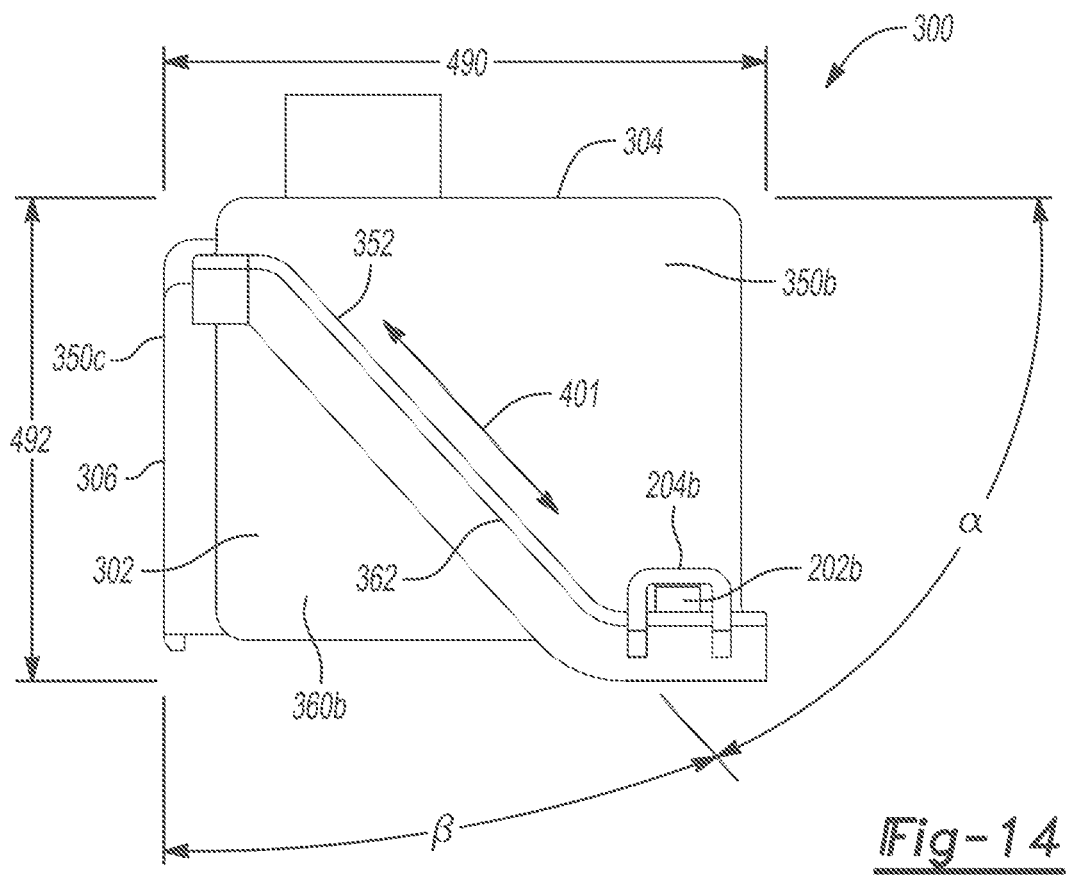
FIG. 14 depicts a side view of the assembly as illustrated in connection with FIGS. 6-8 in accordance with one embodiment.

FIG. 14 depicts a side view of the assembly 300 as illustrated in connection with FIG. 8. As noted above, the assembly 300 may include a loudspeaker size of, for example, 40 mm. As also noted above, when the grille enclosure 304 is mated to the base enclosure 302, the ramped surfaces 352 and 362 abut one another. The ramped surface 352 on the first and the second sides 350a, 350b of the grille enclosure 304 is generally inclined relative to the integrated loudspeaker grille 306 on the grille enclosure 304. Likewise, the ramped surface 362 on the first and second sides of the base enclosure 302 is generally inclined relative to the integrated loudspeaker grille 306 on the grille enclosure 304. In general, the ramped surface 352 of the grille enclosure 304 and the ramped surface 362 of the base enclosure 302 extend along a non-perpendicular axis 401 relative to the integrated loudspeaker grille 306.

As shown, the base enclosure 302 defines an overall length, L (e.g., see longitudinal axis 490). In addition, the base enclosure 302 and the grille enclosure 304 define an overall height, H (e.g., vertical axis 492). Thus, the ramped surface 352 on the first and the second sides 350a, 350b of the grille enclosure 304 is generally formed at an angle $\alpha$ in reference to the axes 490 and 492. Preferably, the angle $\alpha$ may be any angle between 30° and 65°. Likewise, the ramped surface 362 on the first and second sides 360a, 360b of the base enclosure 302 is generally formed at an angle $\beta$ in reference to the axes 490 and 492. Preferably, the angle $\beta$ may be any angle between 28° and 63°. The angle $\beta$ may correspond to an injection molding draft angle. In general, the draft angle corresponds to an angle on walls of a component to enable the part to be removed from a mold after injection. On plastic parts (e.g., enclosures), vertical walls may have, for example, a 0.5 to 5 degrees taper angle. For example, the bottom of a wall may be thick compared to a top of a wall. In the disclosed embodiments, angle $\alpha$ may be generally defined as an angle from a top surface of the grille enclosure 304 (top surface of the grille enclosure 304 as shown in FIG. 14) to the ramped surface 352 where sealing occurs between the base enclosure 302 and the grille enclosure 304. The angle $\beta$ includes the draft angle of a back side of the grille enclosure 304 (e.g., the side 350c) to the ramped surface 362.

By providing the ramped surface 352 of the first and the second sides 350a, 350b at the angle $\alpha$ as noted above and providing the ramped surface 362 of the first and second sides 360a, 360b at the angle $\theta$ as noted above, the assembly 300 may then provide the loudspeaker grille 306 that is integrated with the grille enclosure 304. For example, such angles (e.g., $\alpha$, $\beta$) enables the injection mold to provide the integrated loudspeaker grille 306 with the grille enclosure 304. As noted above, the injection tool generally includes sliders and lifters that move (e.g., open or close) in various orientations or angles (or "action" as known in the art). Thus, the tool may be controlled with the assistance of action (e.g., additional movement both above and beyond the opening of core and cavity of the tool) to form the ramped surface 352 on the first and the second sides 350a, 350b and to also form the integrated grille enclosure 304 on the third side 350c.

Figure 15:
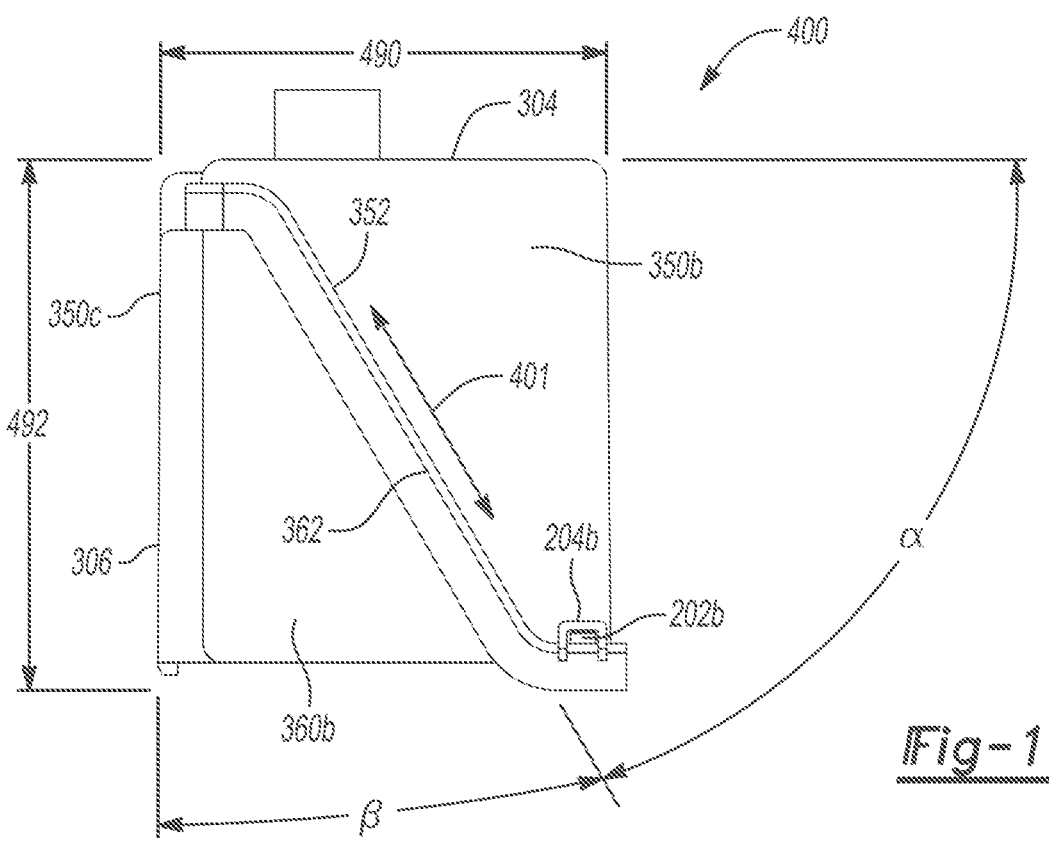
FIG. 15 depicts a side view of the assembly as illustrated in connection with FIGS. 11-13 in accordance with one embodiment.

FIG. 15 depicts a side view of the assembly 400 as illustrated in connection with FIG. 13. As noted above, the assembly 400 may include a loudspeaker size of, for example, 80 mm. As also noted above, when the grille enclosure 304 is mated to the base enclosure 302, the ramped surfaces 352 and 362 are positioned directly adjacent to one another. The angles $\alpha, \beta$ as set forth in connection with FIG. 14 similarly apply to the ramped surfaces 352, 362 as shown in FIG. 15. Similarly, as noted above with FIG. 14, The ramped surface 352 of the grille enclosure 304 and the ramped surface 362 of the base enclosure 302 extend along a non-perpendicular axis 401 relative to the integrated loudspeaker grille 306. In one example, and generally, it is recognized the ramped surface 362 of the base enclosure 302 is generally formed at an angle between zero and ninety degrees relative to the integrated loudspeaker grille 306. Similarly, in another example, it is recognized that the ramped surface 352 of the grille enclosure 304 is formed at an angle that is greater than zero degrees and less than ninety degrees relative to a first side of the grille enclosure 304.

Figure 16A:
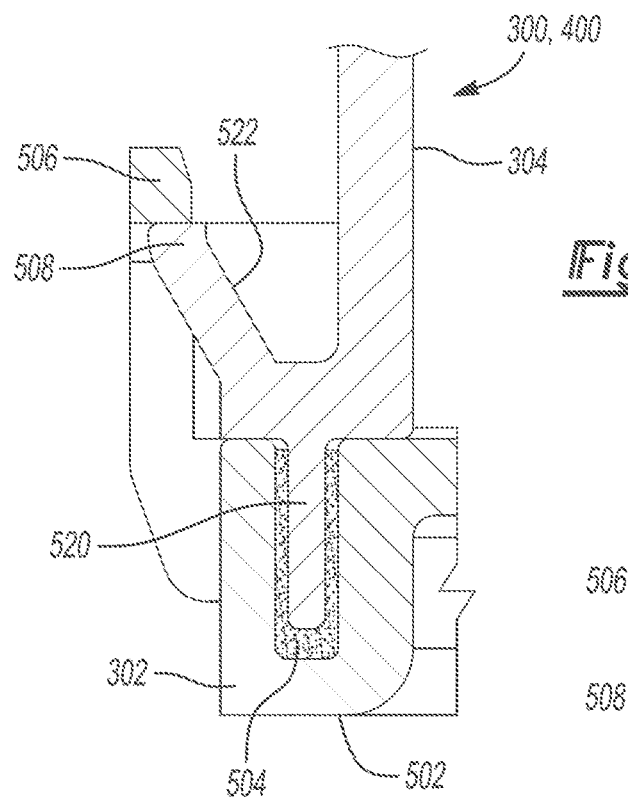
FIGS. 16A-16C depict examples of locking features provided on a base enclosure and/or a grille enclosure in accordance with one embodiment.

FIG. 16A illustrates one example of locking features provided on the base enclosure 302 and/or the grille enclosure 304 to couple such enclosures 302, 304 together to provide an air/watertight seal in accordance with an embodiment. The assemblies 300 or 400 include the base enclosure 302 forming a receiving section 502 that defines a groove 504. A tongue 520 protrudes from an end of the grille enclosure 304 and is inserted into the groove 504. A flexible latch 506 having a recess 508 is formed on the base enclosure 302. The grille enclosure 304 includes a ledge 522 that is inserted into the recess 508 as the tongue 520 is fully positioned in the groove 504. Any voids that are present in the groove 504 after the tongue 520 is inserted therein may be filled with adhesive sealing.

Figure 16B:
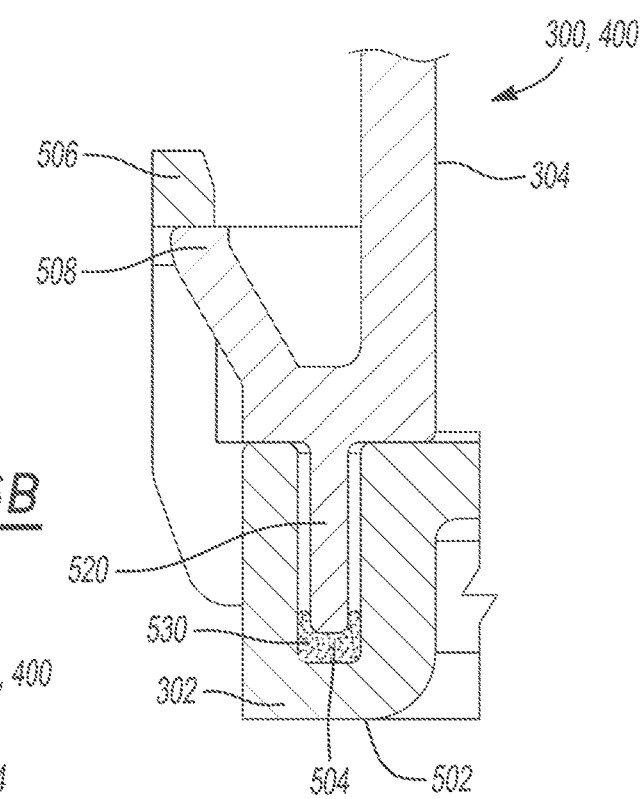

FIG. 16B illustrates another example of locking features provided on the base enclosure 302 and/or the grille enclosure 304 in accordance with one embodiment. The embodiment illustrated in connection with FIG. 16B is similar to that illustrated in FIG. 16A. However, for the embodiment illustrated in FIG. 16B, a compressible gasket 530 is positioned within the groove 504 for receiving the tongue 520. The compressible gasket 530 may be used instead of the adhesive.

Figure 16C:
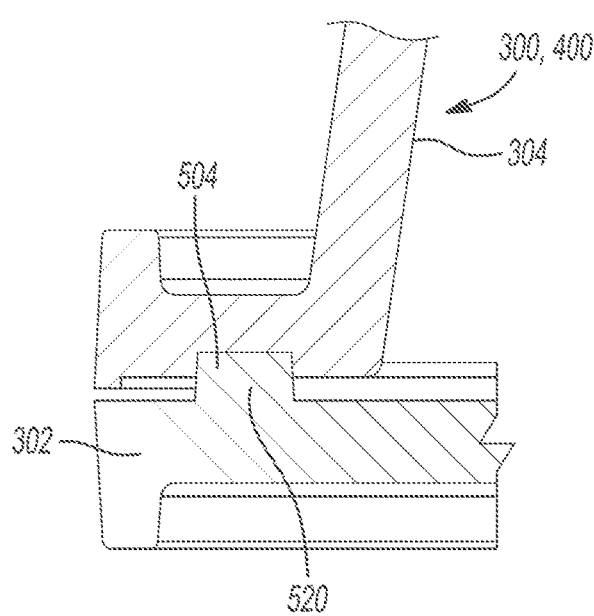

FIG. 16C illustrates another example of locking features provided on the base enclosure 302 and/or the grille enclosure 304 in accordance with one embodiment. The base enclosure 302 includes the tongue 520 (or a weld rib 520) that is formed on the base enclosure 302. The tongue 520 may be implemented as a weld rib. For example, the weld rib 520 may be melted via weld operation (or excited by movement) and flow onto a flat surface that is formed between the base enclosure 302 and the grille enclosure 304. Once cooled, the base enclosure 302 and the grille enclosure 304 are coupled to one another. In general, the base enclosure 302 and the grille enclosure 304 may be welded together (e.g., vibration welding) at via the weld rib 520.

Figure 17A:
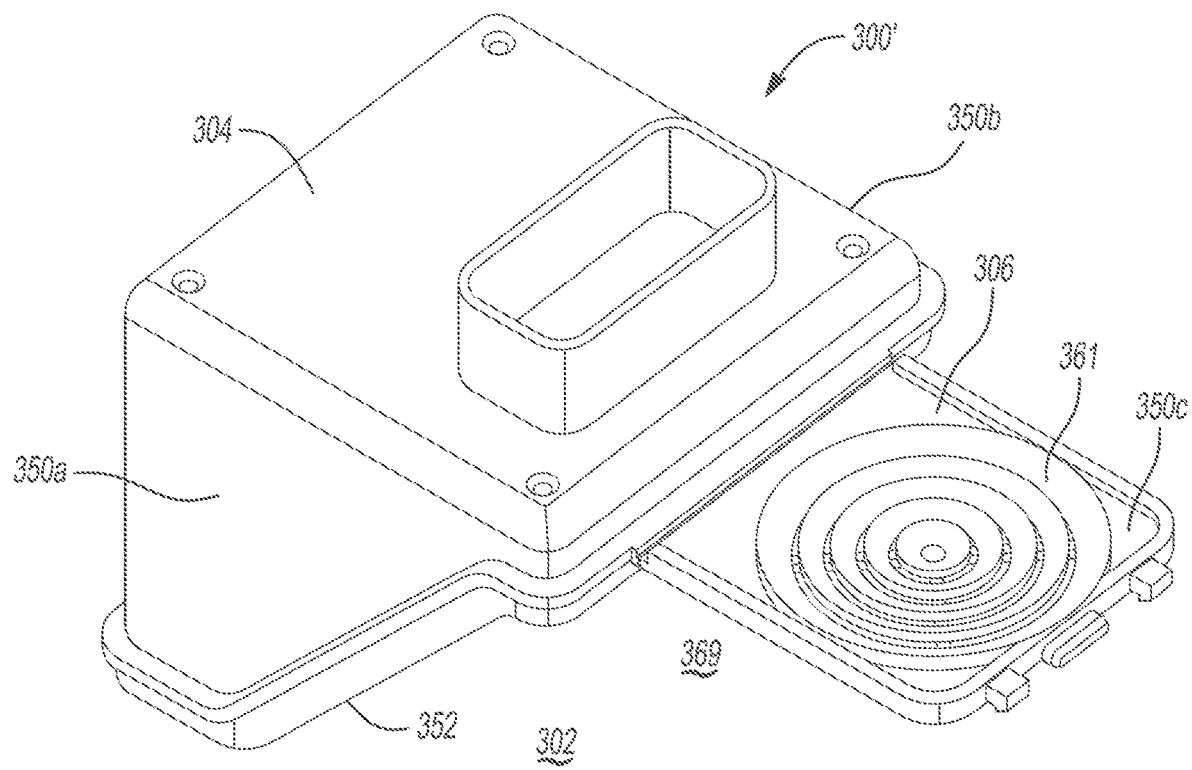
FIG. 17A-17C generally depict a loudspeaker assembly including an integrated loudspeaker grille that includes a living hinge in accordance with one embodiment.
Figure 17B:
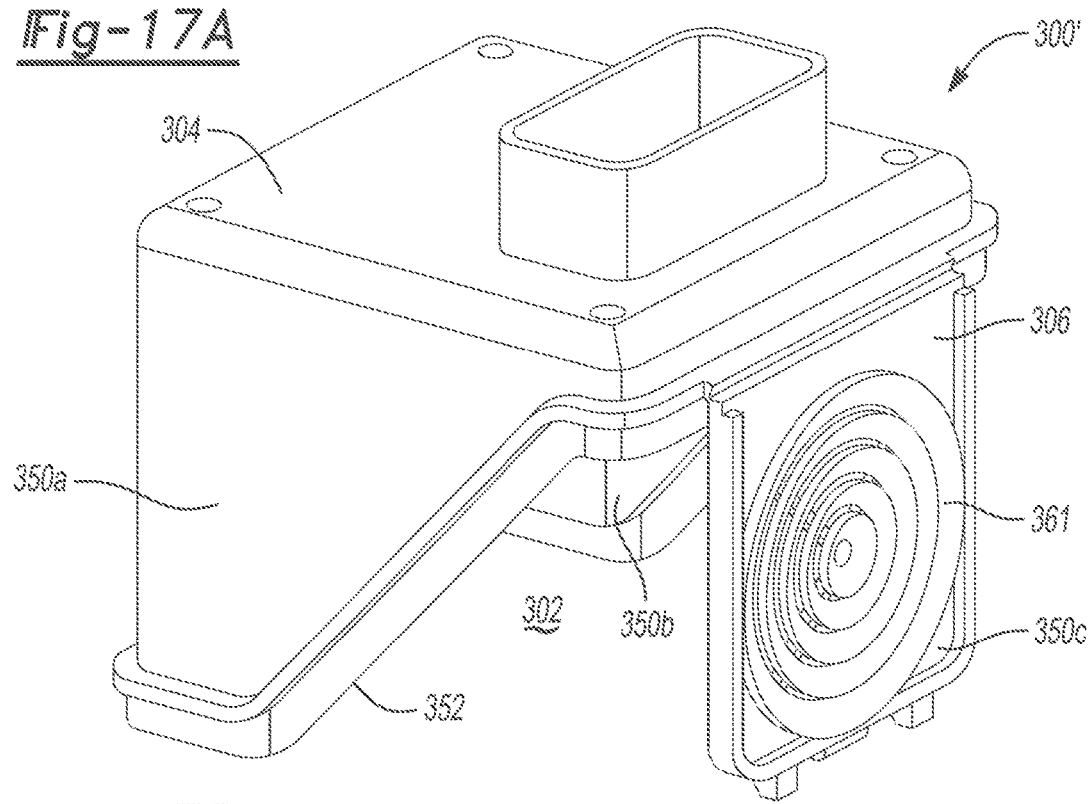
Figure 17C:
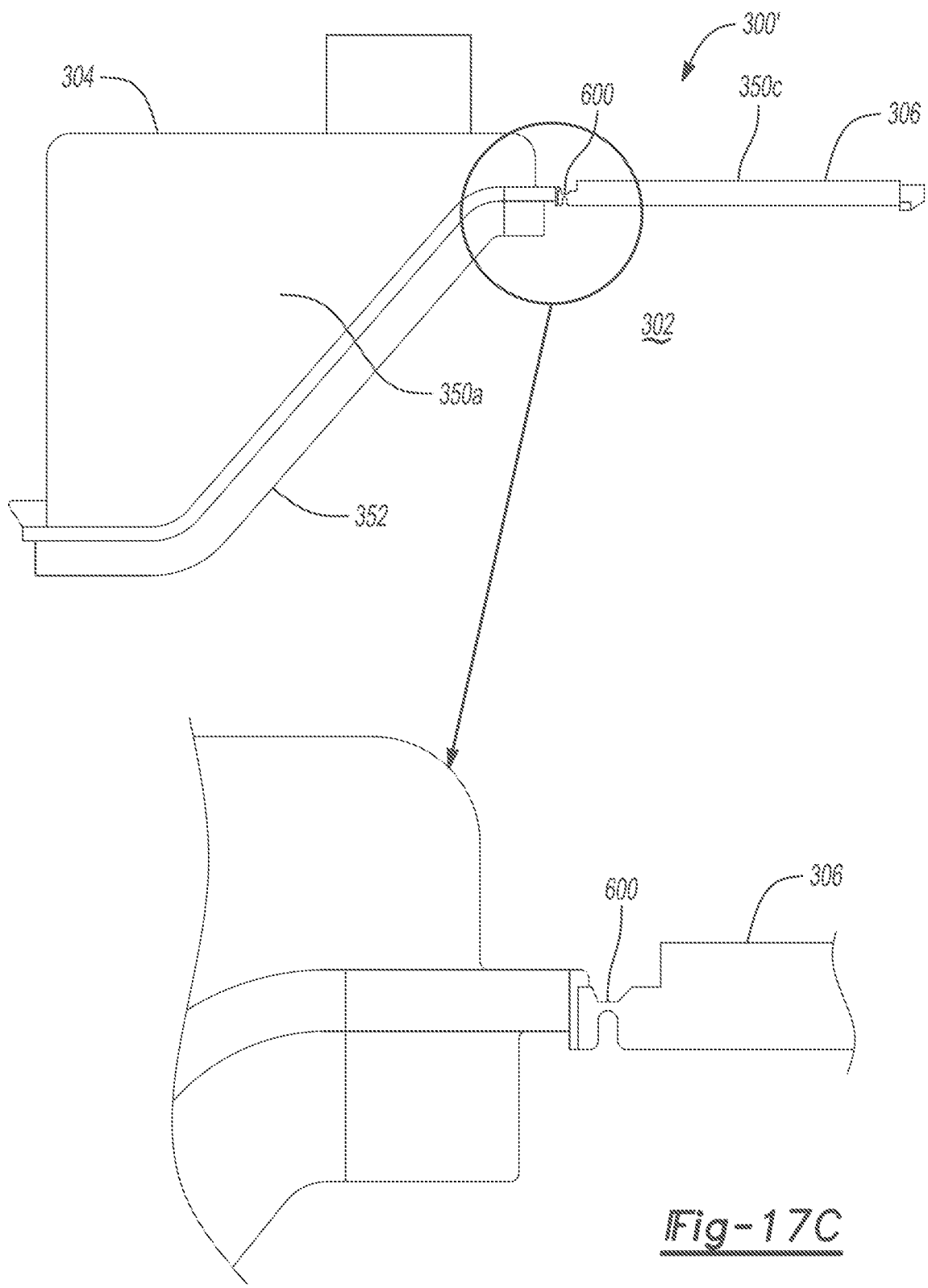

FIG. 17A-17C generally depict a loudspeaker assembly 300' including an integrated loudspeaker grille 306 that includes a living hinge 600. The living hinge 600 enables the loudspeaker grille 306 to rotate within the opening 369. For example, the living hinge 600 may rotate toward or away from the ramped surface 352. It is recognized that the living hinge 600 may be implemented or utilized on the grille enclosure 304 for any given loudspeaker size (e.g., 40 mm, 80 mm, etc.). FIGS. 17A and 17C generally depict the loudspeaker assembly 300' with the living hinge 600 being in a fully opened state. FIG. 17B generally depicts the loudspeaker assembly 300' with the living hinge 600 in a closed state. In general, the living hinge 600 may be moved or rotated within the opening 369 and relative to the base enclosure 302. Such a rotation of the living hinge 600 may enable the plurality of louvers 361 to reside at any number of angles to prevent fluid intrusion without the need for a complex injection molding tool. The living hinge 600 may be formed of various plastic resins such as nylon, high density poly-ethylene (HDPE), low density poly-ethylene (LDPE), and polypropylene (PP). As shown in more detail in connection with FIG. 17C, the living hinge 600 may correspond to a flexible protrusion that couples the loudspeaker grille 306 to the grille enclosure 304. The protrusion may be thinner than an overall thickness of the loudspeaker grille 306 to enable the grille 306 to rotate above the grille enclosure 304.

Figure 18:
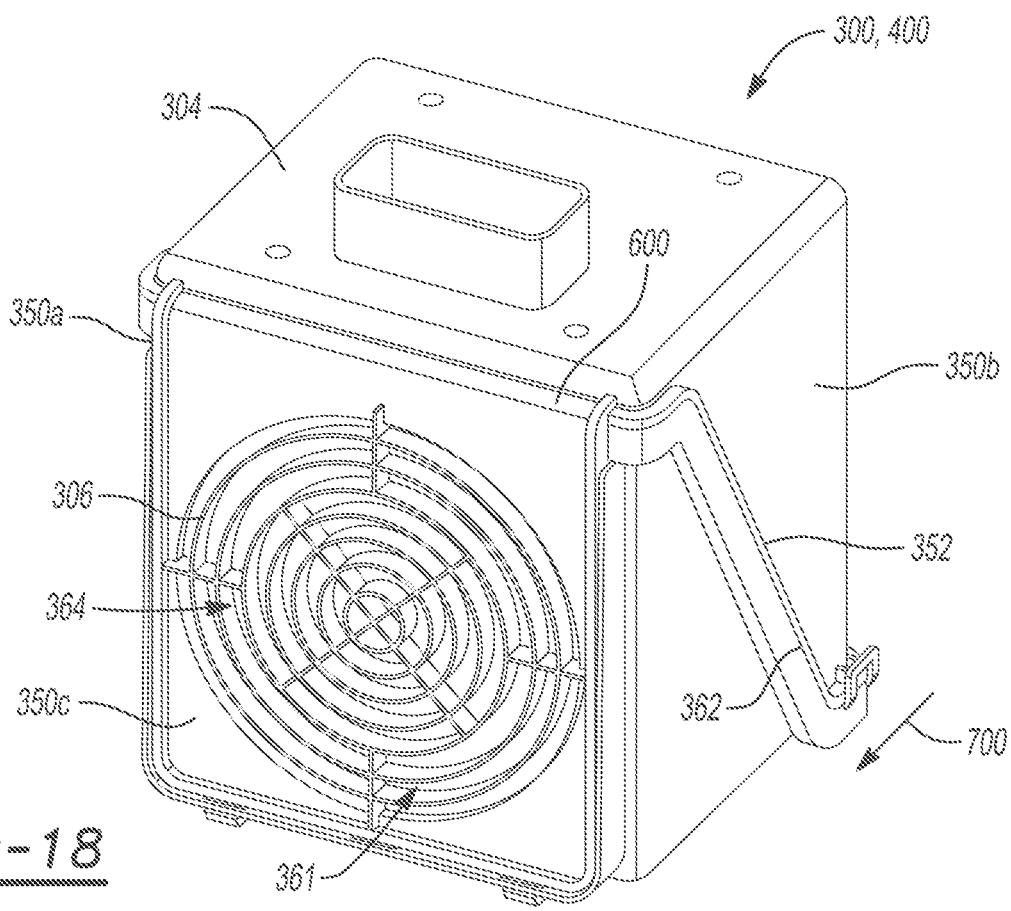
FIGS. 18-21 generally depict various loudspeaker assemblies with example of different loudspeaker grilles in accordance with one embodiment.

FIG. 18 generally depicts another example of the assembly 300, 400 in accordance with one embodiment. References to the various elements remain similar to those as set forth above unless stated differently in reference to FIG. 18. The integrated grille enclosure 304 includes the plurality of louvers 361 that define the openings 364. However, in this instance, the louvers 361 are not angled to overlap adjacent louvers. For example, the louvers 361 extend horizontally on an axis 700 that is perpendicular to the side 350c of the grille enclosure 304. In other words, the louvers 361 may be planar. It is recognized that the assembly 300, 400 may or may not include the living hinge 600. FIG. 18 further illustrates that the grille enclosure 304 is generally planar.

Figure 19:
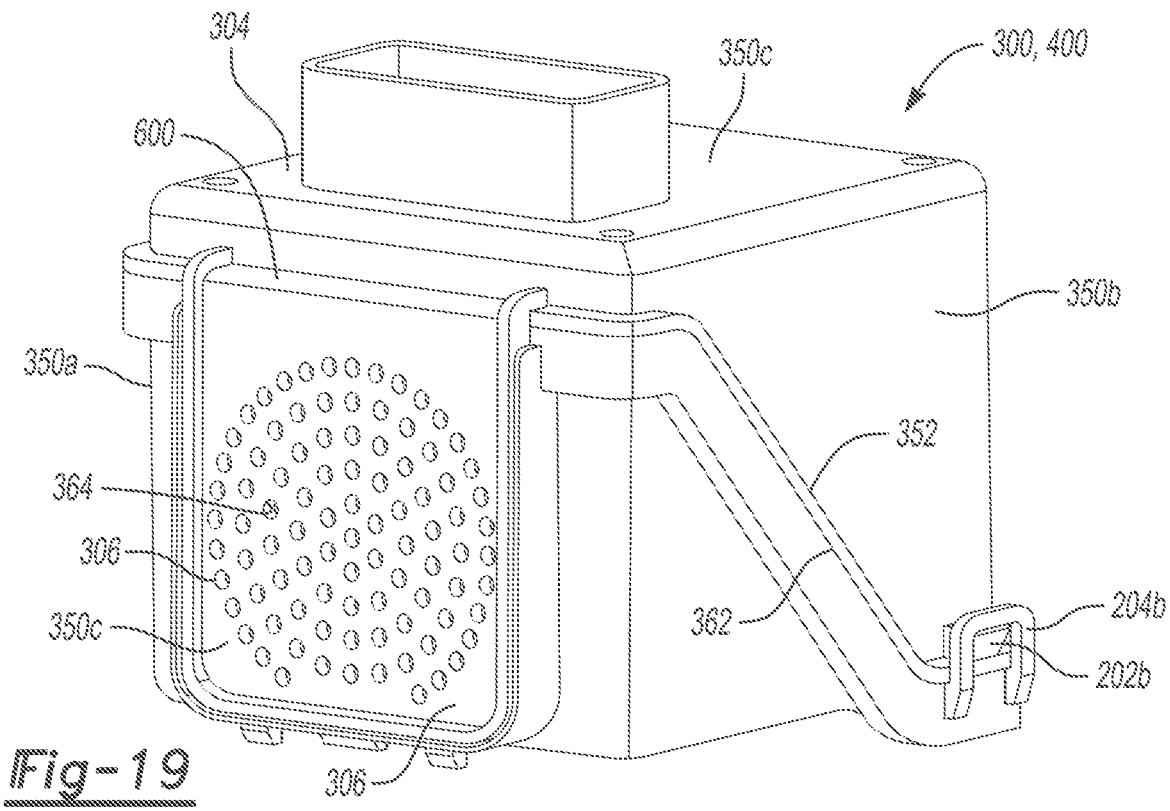

FIG. 19 generally depicts another example of the assembly 300, 400 in accordance with one embodiment. References to the various elements remain similar to those as set forth above unless stated differently in reference to FIG. 19. As shown, the integrated grille enclosure 304 provides only the openings 364 to enable sound to transmit from the assembly 300, 400. It is recognized that the assembly 300, 400 may or may not include the living hinge 600. FIG. 19 further illustrates that the grille enclosure 304 is generally planar.

Figure 20:
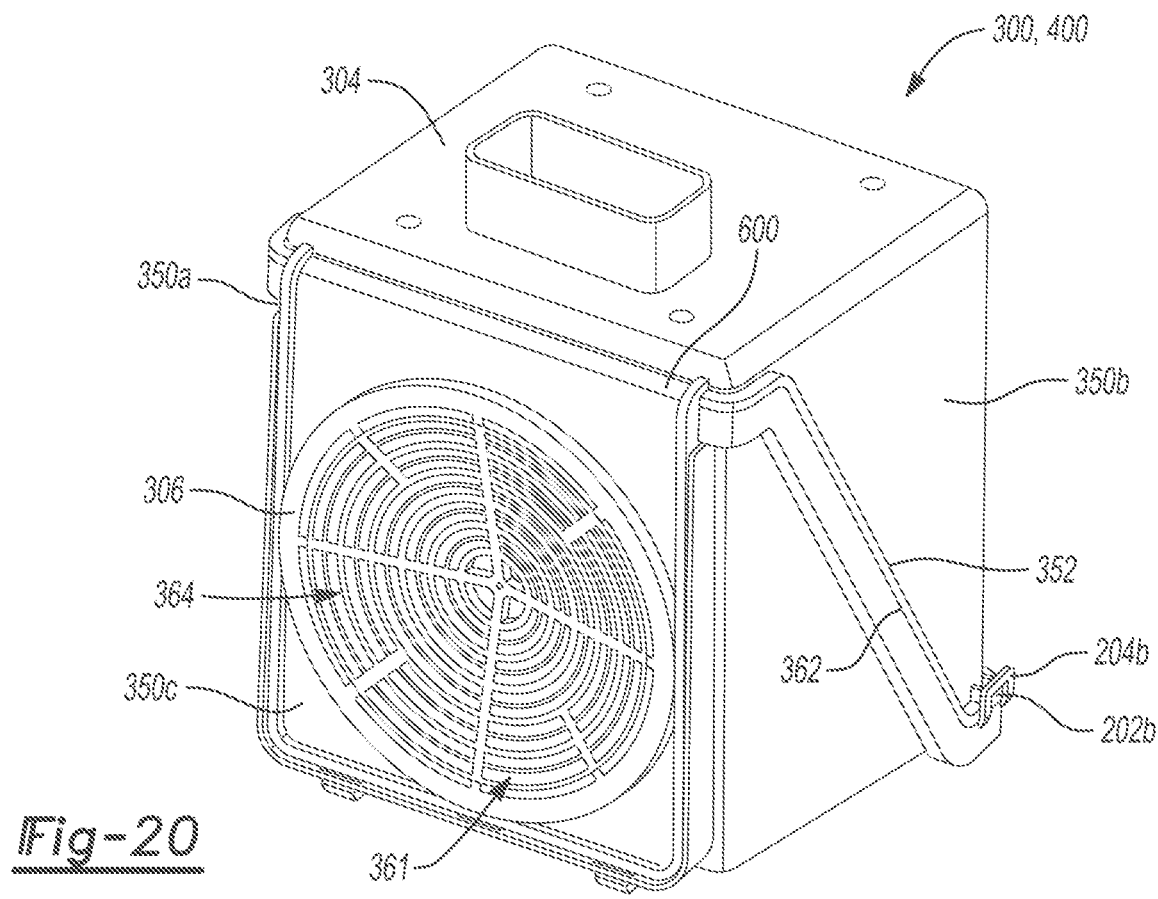
Figure 21:
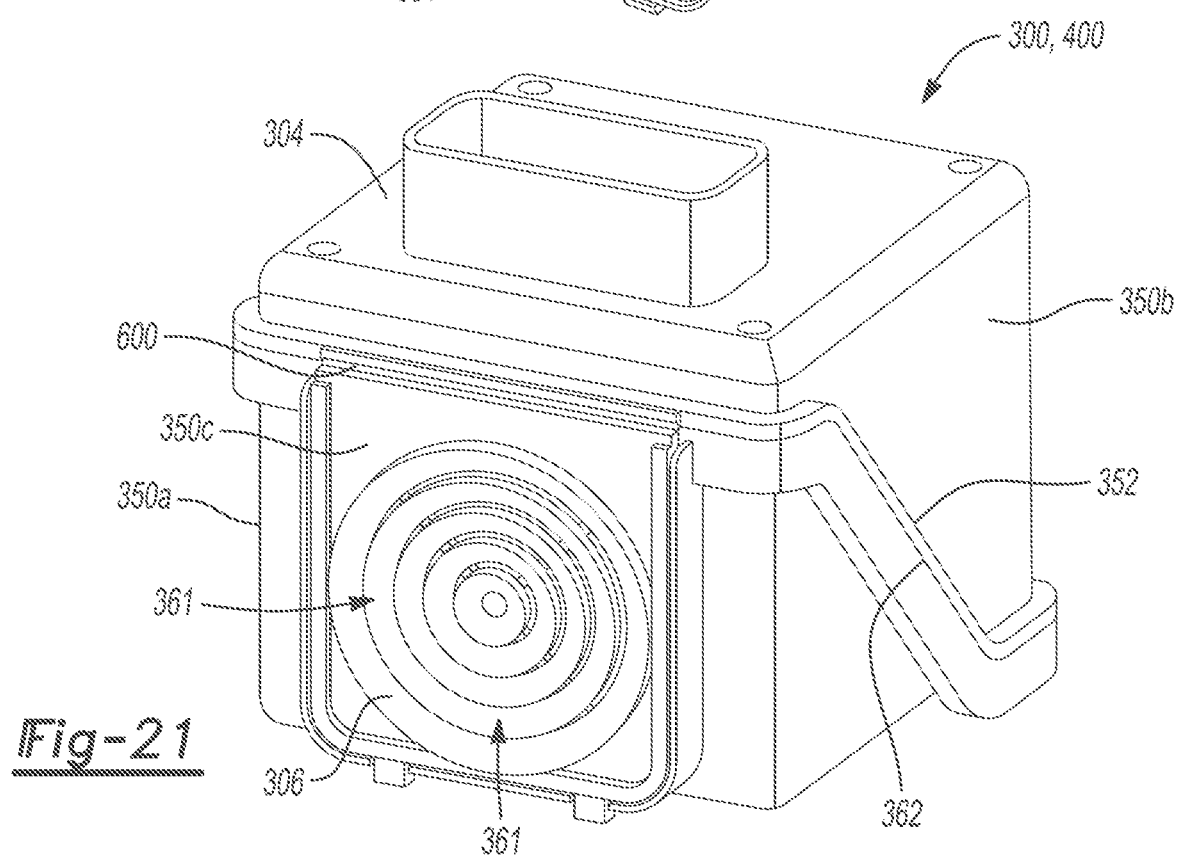

FIGS. 20 and 21 generally depict additional example of the assembly 300, 400 in accordance with one embodiment. References to the various elements remain similar to those as set forth above unless stated differently in reference to FIGS. 20 and 21. The integrated grille enclosure 306 includes the plurality of angled louvers 361 that define the openings 364. As shown, the integrated grille 306 may be non-planar. In one example, the integrated grille 306 may be shaped as a cone that tapers toward the loudspeaker 308 positioned within the base enclosure 302 and the grille enclosure 304. It is recognized that the assembly 300, 400 may or may not include the living hinge 600.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly for attachment to an exterior portion of a vehicle, the assembly comprising:
   a loudspeaker for transmitting an audio output into an environment that is exterior to the vehicle;
   a base enclosure to receive the loudspeaker and including a first ramped surface formed on an exterior portion thereof; and
   a grille enclosure including an integrated loudspeaker grille to cover the loudspeaker, the grille enclosure further including a second ramped surface positioned on an exterior portion thereof and being positioned in abutment with the first ramped surface of the base enclosure when the base enclosure is coupled to the grille enclosure,
   wherein each of the first ramped surface and the second ramped surface is non-perpendicular to the integrated loudspeaker grille.

2. The loudspeaker assembly of claim 1, wherein the first ramped surface is formed at an angle that is greater than zero degrees and less than ninety degrees relative to the integrated loudspeaker grille.

3. The loudspeaker assembly of claim 2, wherein the first ramped surface is formed at the angle of between twenty-eight degrees and sixty-three degrees relative to the integrated loudspeaker grille.

4. The loudspeaker assembly of claim 1, wherein the second ramped surface is formed at an angle that is greater than zero degrees and less than ninety degrees relative to a first side of the grille enclosure.

5. The loudspeaker assembly of claim 4, wherein the second ramped surface is formed at an angle that is between thirty degrees and sixty-five degrees relative to the first side of the grille enclosure.

6. The loudspeaker assembly of claim 1, wherein first side of the grille enclosure is coupled to the exterior of the vehicle and the integrated loudspeaker grille is positioned opposite to the first side of the grille enclosure to enable the audio output to be transmitted directly into an ambient environment surrounding the vehicle.

7. The loudspeaker assembly of claim 1, wherein the integrated loudspeaker grille includes a plurality of louvers defining a plurality of openings to enable the audio output to pass through the plurality of openings.

8. The loudspeaker assembly of claim 7, wherein each of the plurality of louvers are angled and overlap one another to prevent fluid from contacting the loudspeaker.

9. The loudspeaker assembly of claim 1, wherein the integrated loudspeaker grille includes a first end that is formed only on a single side of the grille enclosure.

10. The loudspeaker assembly of claim 9, wherein the integrated loudspeaker grille includes a second end positioned opposite to the first end that is received by the base enclosure to couple the grille enclosure to the base enclosure.

11. The loudspeaker assembly of claim 1, wherein the grille enclosure includes a living hinge positioned on a first end of the integrated loudspeaker grille to enable the integrated loudspeaker grille to rotate to and from the base enclosure.

12. The loudspeaker assembly of claim 1, wherein the base enclosure includes a loudspeaker basket integrated therewith to receive the loudspeaker.

13. The loudspeaker assembly of claim 12, wherein the integrated loudspeaker grille covers the loudspeaker basket when the base enclosure is coupled with the grille enclosure.

14. The loudspeaker assembly of claim 1, wherein the integrated loudspeaker grille includes a conical shaped portion and a plurality of openings formed thereon, and wherein the conical shaped portion and the plurality of openings extend inwardly toward the loudspeaker.

15. The loudspeaker assembly of claim 14, wherein the integrated loudspeaker grille is generally planar and defines a plurality of openings thereon to enable the audio output to pass therethrough.

16. A loudspeaker assembly for attachment to a vehicle, the assembly comprising:
   a loudspeaker for transmitting an audio output from the vehicle;
   a base enclosure to receive the loudspeaker and including a first ramped surface formed on an exterior portion thereof; and
   a grille enclosure including an integrated loudspeaker grille to cover the loudspeaker, the grille enclosure further including a second ramped surface on an exterior portion thereof and being positioned adjacent to the first ramped surface of the base enclosure when the base enclosure is coupled to the grille enclosure,
   wherein each of the first ramped surface and the second ramped surface extend along a non-perpendicular axis relative to the integrated loudspeaker grille, and
   wherein the first ramped surface is formed at an angle that is greater than zero degrees and less than ninety degrees relative to the integrated loudspeaker grille.

17. The loudspeaker assembly of claim 16, wherein the second ramped surface is formed at an angle that is greater than zero degrees and less than ninety degrees relative to a first side of the grille enclosure.

18. A loudspeaker assembly for attachment to a vehicle, the assembly comprising:
   a loudspeaker for transmitting an audio output from the vehicle;
   a base enclosure to receive the loudspeaker and including a first ramped surface formed thereon; and
   a grille enclosure including an integrated loudspeaker grille to cover the loudspeaker, the grille enclosure further including a second ramped surface being positioned adjacent to the first ramped surface of the base enclosure when the base enclosure is coupled to the grille enclosure,
   wherein each of the first ramped surface and the second ramped surface extend along a non-perpendicular axis relative to the integrated loudspeaker grille, and
   wherein the grille enclosure includes a living hinge positioned on a first end of the integrated loudspeaker grille to enable the integrated loudspeaker grille to rotate to and from the base enclosure.

19. A loudspeaker assembly for attachment to a vehicle, the assembly comprising:
   a loudspeaker for transmitting an audio output from the vehicle;
   a base enclosure to receive the loudspeaker and including a first ramped surface formed on an exterior portion thereof; and
   a grille enclosure including an integrated loudspeaker grille to cover the loudspeaker, the grille enclosure further including a second ramped surface on an exterior portion thereof and being positioned adjacent to the first ramped surface of the base enclosure when the base enclosure is coupled to the grille enclosure,
   wherein each of the first ramped surface and the second ramped surface extend along a non-perpendicular axis relative to the integrated loudspeaker grille, and
   wherein the second ramped surface is formed at an angle that is greater than zero degrees and less than ninety degrees relative to a first side of the grille enclosure.

20. A loudspeaker assembly for attachment to an exterior portion of a vehicle, the assembly comprising:
   a loudspeaker for transmitting an audio output into an environment that is exterior to the vehicle;
   a base enclosure to receive the loudspeaker and including a first ramped surface formed on an exterior portion thereof; and
   a grille enclosure including an integrated loudspeaker grille to cover the loudspeaker, the grille enclosure further including a second ramped surface positioned on an exterior portion thereof and being positioned directly adjacent to the first ramped surface of the base enclosure when the base enclosure is coupled to the grille enclosure,
   wherein each of the first ramped surface and the second ramped surface is non-perpendicular to the integrated loudspeaker grille, and
   wherein the grille enclosure includes a living hinge positioned on a first end of the integrated loudspeaker grille to enable the integrated loudspeaker grille to rotate to and from the base enclosure.

* * * * *